(12) United States Patent
Cui et al.

(10) Patent No.: US 11,081,688 B2
(45) Date of Patent: Aug. 3, 2021

(54) SILICON SEALING FOR HIGH PERFORMANCE BATTERY ANODE MATERIALS

(71) Applicant: The Board of Trustees of the Leland Stanford Junior University, Stanford, CA (US)

(72) Inventors: Yi Cui, Stanford, CA (US); Lei Liao, San Jose, CA (US); Jiangyan Wang, Palo Alto, CA (US)

(73) Assignee: THE BD OF TRUSTEES OF THE LELAND STANFORD JR UNIV, Stanford, CA (US)

( * ) Notice: Subject to any disclaimer, the term of this patent is extended or adjusted under 35 U.S.C. 154(b) by 31 days.

(21) Appl. No.: 16/356,487

(22) Filed: Mar. 18, 2019

(65) Prior Publication Data

US 2019/0305295 A1  Oct. 3, 2019

Related U.S. Application Data

(60) Provisional application No. 62/650,576, filed on Mar. 30, 2018.

(51) Int. Cl.
*H01M 4/134* (2010.01)
*H01M 4/04* (2006.01)
(Continued)

(52) U.S. Cl.
CPC .......... *H01M 4/134* (2013.01); *C01B 33/021* (2013.01); *H01M 4/0471* (2013.01);
(Continued)

(58) Field of Classification Search
CPC .... H01M 4/134; H01M 4/386; H01M 4/0471; H01M 4/366; H01M 4/625;
(Continued)

(56) References Cited

U.S. PATENT DOCUMENTS

2010/0297502 A1* 11/2010 Zhu .................. H01M 4/583
429/231.8
2013/0344391 A1  12/2013 Yushin et al.
(Continued)

FOREIGN PATENT DOCUMENTS

WO    WO2017140642    *  8/2017

OTHER PUBLICATIONS

Niesar et al., "Defect reduction in silicon nanoparticles by low-temperature vacuum annealing," 2010, Applied Physics Letters, 96. 193112-1 to 193112-3. (Year: 2010).*
(Continued)

*Primary Examiner* — Ula C Ruddock
*Assistant Examiner* — Matthew W Van Oudenaren
(74) *Attorney, Agent, or Firm* — Sheppard Mullin Richter & Hampton LLP

(57) ABSTRACT

A battery electrode is provided that includes a porous silicon microstructure precursor, a silicon shell coating deposited on the silicon microstructure precursor, and a graphene coating deposited on the silicon shell coating, where the graphene coating encapsulates the silicon shell coating forming a graphene-encapsulated silicon-shell-protected porous silicon microstructure precursor battery electrode.

19 Claims, 9 Drawing Sheets

(51) Int. Cl.
*H01M 4/38* (2006.01)
*C01B 33/021* (2006.01)
*H01M 4/02* (2006.01)

(52) U.S. Cl.
CPC ......... *H01M 4/386* (2013.01); *C01P 2004/03* (2013.01); *C01P 2004/04* (2013.01); *C01P 2004/61* (2013.01); *C01P 2006/40* (2013.01); *H01M 2004/021* (2013.01); *H01M 2004/027* (2013.01)

(58) Field of Classification Search
CPC ..... H01M 2004/021; H01M 2004/027; H01M 4/362; H01M 10/0525; C01B 33/021
See application file for complete search history.

(56) References Cited

U.S. PATENT DOCUMENTS

| | | | | |
|---|---|---|---|---|
| 2015/0099187 A1* | 4/2015 | Cui | ....................... | H01M 4/134 429/231.8 |
| 2015/0318530 A1* | 11/2015 | Yushin | ................. | H01M 10/28 429/131 |
| 2016/0365573 A1* | 12/2016 | Li | ....................... | H01M 4/0492 |
| 2018/0201512 A1* | 7/2018 | Hui | ....................... | H01M 4/622 |
| 2018/0342732 A1* | 11/2018 | Troegel | ................. | H01M 4/134 |

OTHER PUBLICATIONS

Jin et al., "Challenges and Recent Progress in the Development of Si Anodes for Lithium-ion Battery", Advanced Energy Materials, vol. 7, Issue 23, Sep. 21, 2017, (retrieved May 6, 2019 at onlinelibrary.wiley.com/doi/pdf/10.1002/aenm.201700715).

Li et al., "Growih of Conformal Graphene Cages on Micrometre-sized Silicon Particles as Stable Battery Anodes", INature Energy, vol. 1, Article No. 15029, Jan. 25, 2016, (retrieved May 6, 2019 at web.stanford.edu/group/cui_group/papers/Yuzhang_Cui_NATNRG_2016.pdf).

Wang et al., "Shell-Protective Secondary Silicon Nanostructures as Pressure-Resistant High-Volumetric-Capacity Anodes for Lithium-ion Batteries", Nano Letters, 2018, pp. 7060-7065, Oct. 19, 2018, (retrieved May 6, 2019 at web.stanford.web/group/cui_group/papers/Jiangyan_Cui_NANOLETT_2018.pdf).

International Search Report and Written Opinion for PCT/US19/22723 dated May 17, 2019, 5 pages.

* cited by examiner

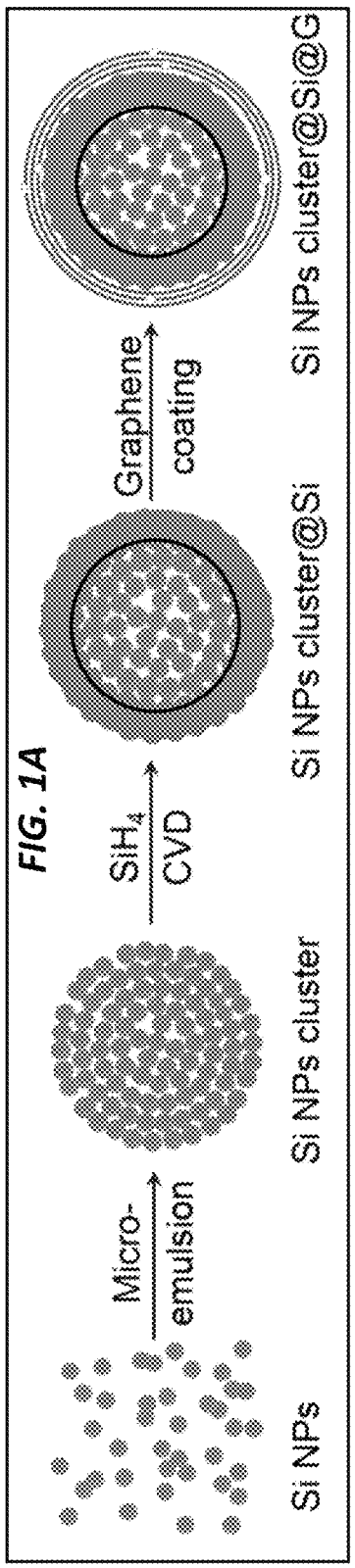
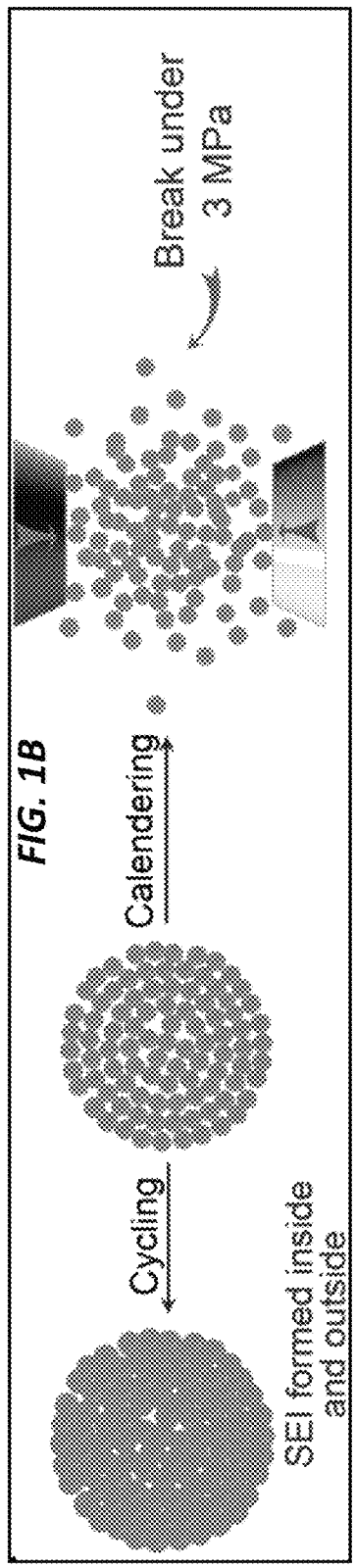
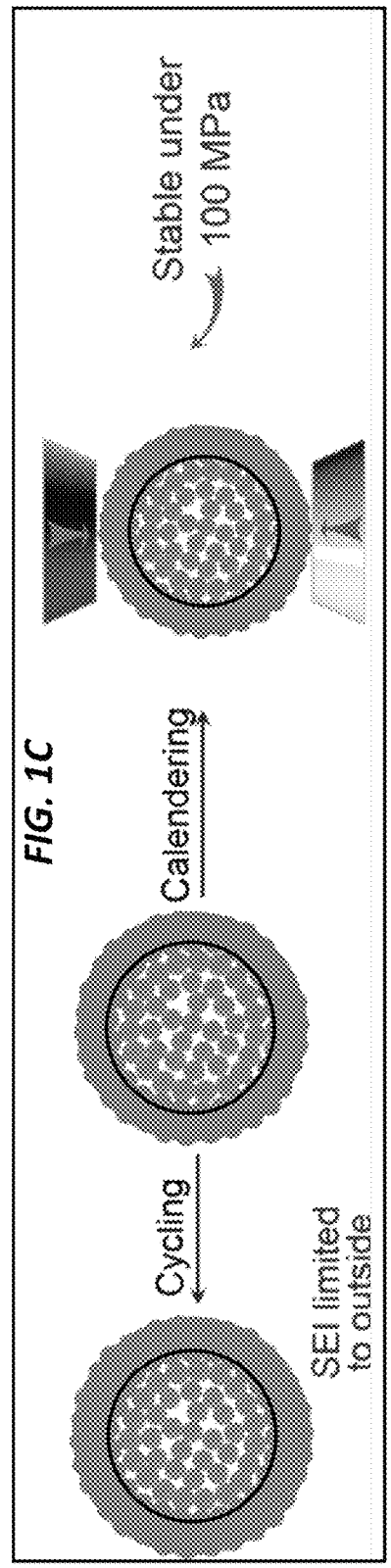
FIG. 1A
FIG. 1B
FIG. 1C

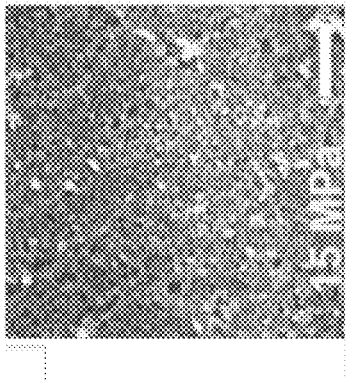 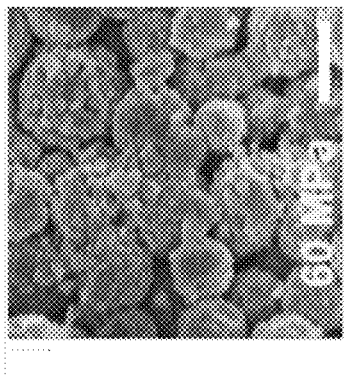 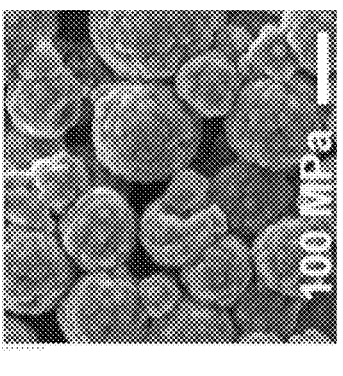
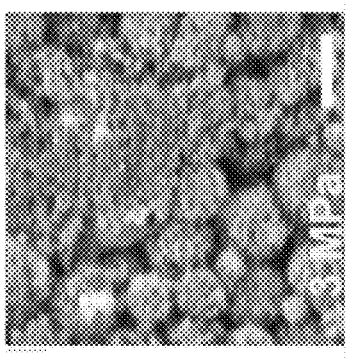 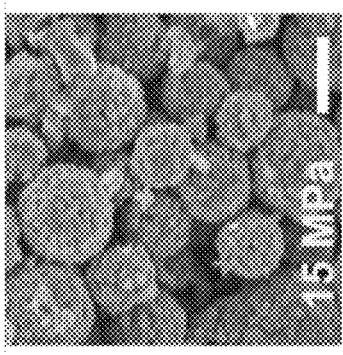 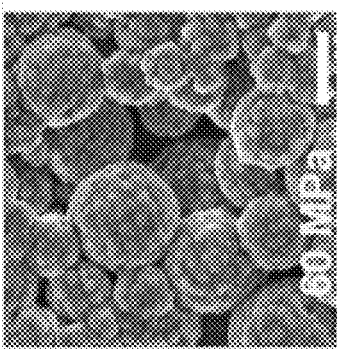
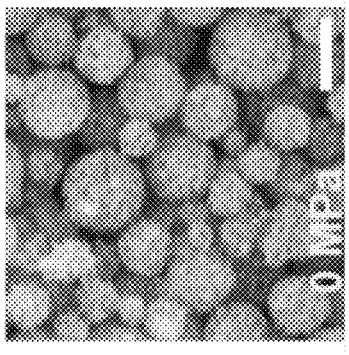 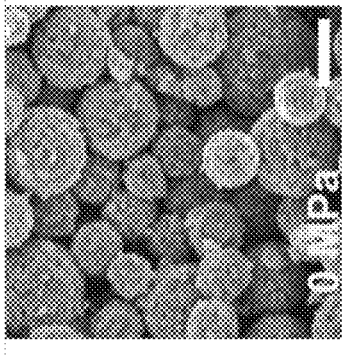 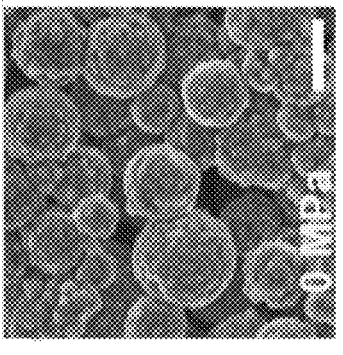
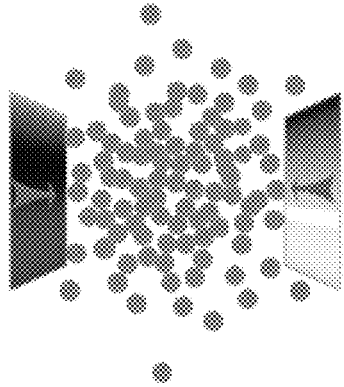 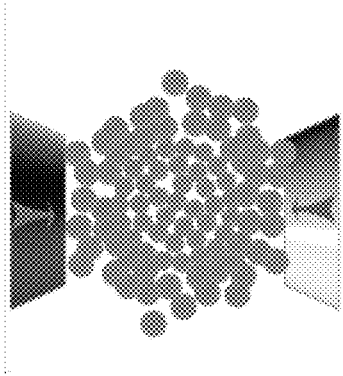 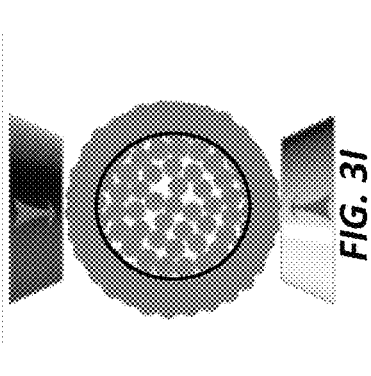

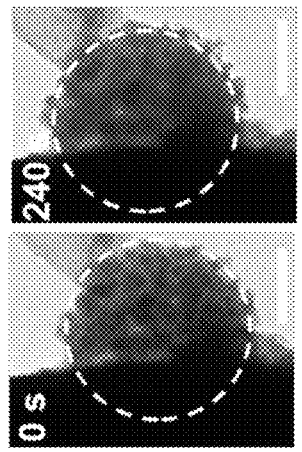
FIG.4D
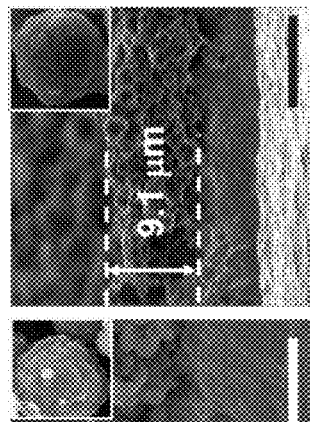
FIG.4E
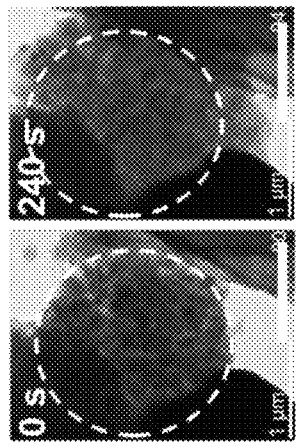
FIG.4F
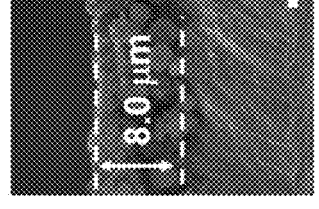
FIG.4G
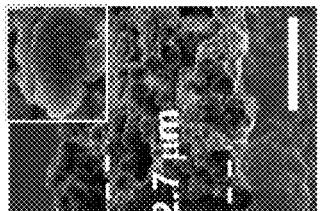
FIG.4H
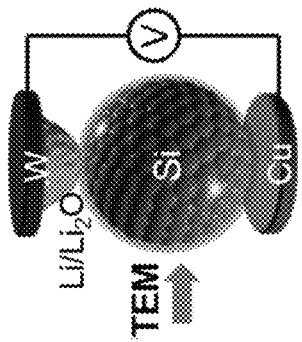
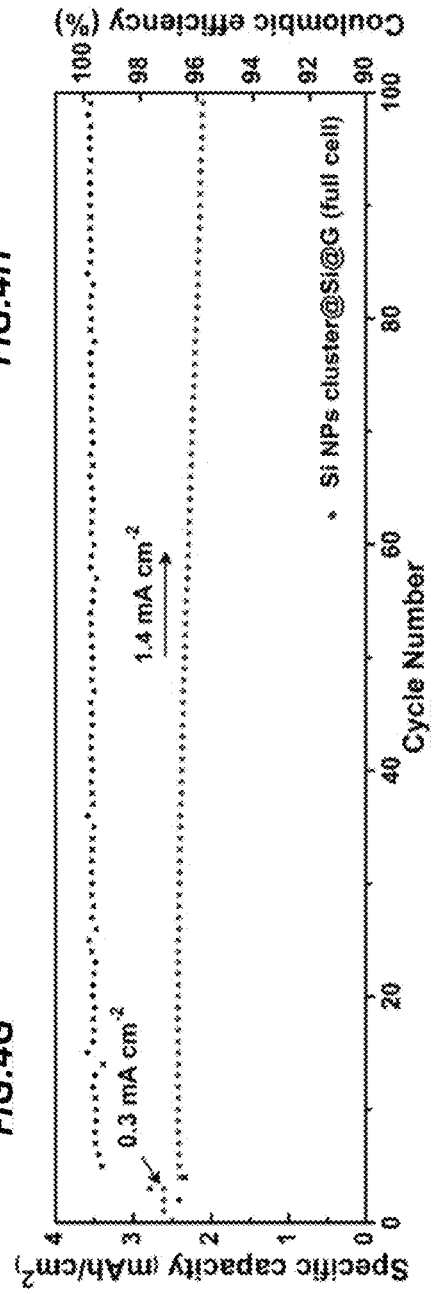
FIG.4I

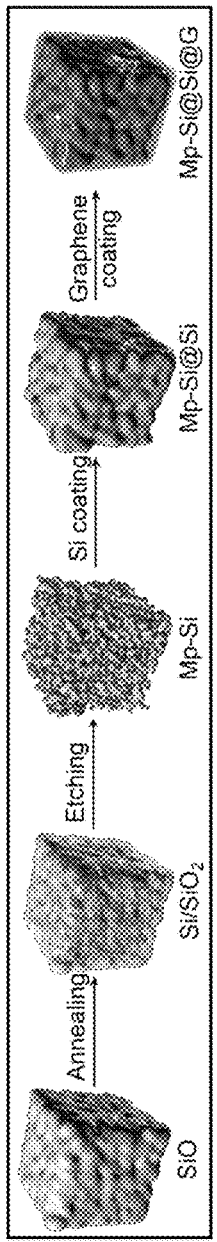
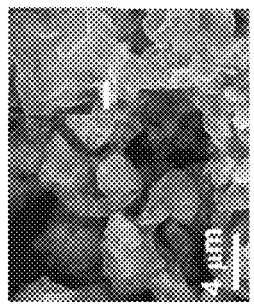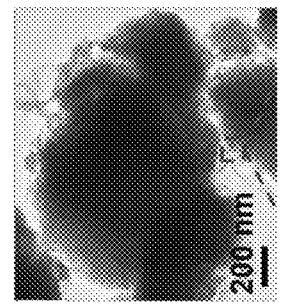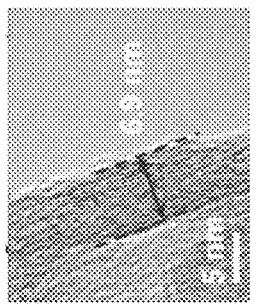
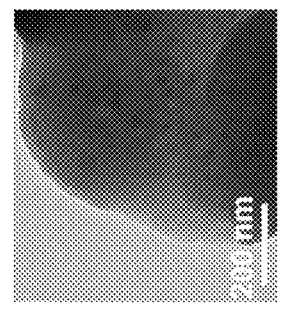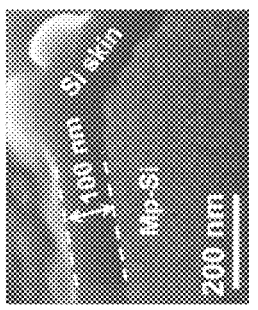
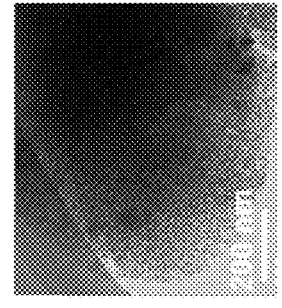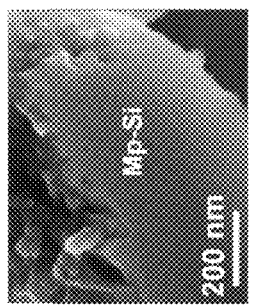
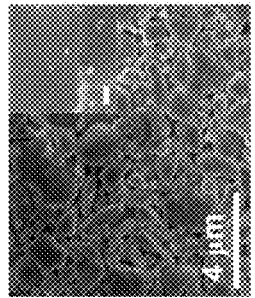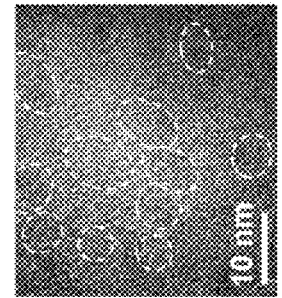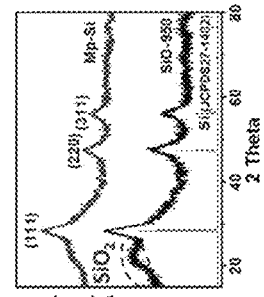

SILICON SEALING FOR HIGH PERFORMANCE BATTERY ANODE MATERIALS

CROSS-REFERENCE TO RELATED APPLICATIONS

This application claims priority from U.S. Provisional Patent Application 62/650,576 filed Mar. 30, 2018, which is incorporated herein by reference.

STATEMENT OF GOVERNMENT SPONSORED SUPPORT

This invention was made with Government support under contract DE-ACO2-76SF00515 awarded by the Department of Energy. The Government has certain rights in the invention.

FIELD OF THE INVENTION

The present invention relates generally to battery electrodes. More particularly, the invention relates to a graphene-encapsulated silicon-shell-protected silicon hollow structure battery electrode.

BACKGROUND OF THE INVENTION

Nanostructured silicon has shown great potential in addressing the volume expansion of silicon anodes during the cycling. However, new challenges exist concerning excessive surface area and poor Coulombic efficiency. Constructing microstructures using nano-units can solve these problems to a certain extent. Unfortunately, the Coulombic efficiency is still dissatisfactory, and the constructed microstructure often suffers from poor mechanical stability and collapses easily during the calendering process, limiting its application in the high-areal-capacity anodes fabrication.

For example, over the past decade, studies on high capacity silicon anodes through nanostructure-design have created exciting promises for high energy batteries. Many challenging issues associated with 300% volume change of silicon anodes have been addressed by structures including nanowires, core-shell, yolk-shell tubes, hollow and porous spheres, pomegranate particles and new binders. An essential concept of these most promising nanostructured silicon anodes is the pre-reserved hollow space to accommodate large volume change for reducing the damage to the electrode. However, it remains as a challenge that the void space such as the gap between carbon shell and silicon microparticles and/or the whole nanostructured structure cannot survive large mechanical pressure during the calendering process of battery electrode fabrication.

The calendering process is an extremely important step of battery electrode fabrication, it packs the electrode materials densely to increase the energy density per volume, improve electrical contact between particles, and increase adhesion between particles and current collector. The mechanical pressure during calendering could go up to 80 MPa, under which most of hollow nanostructures would break. Thus far, electrode processing of many nanostructures can only utilize no or gentle calendering process, resulting in low volumetric energy density, poor electric contact, and low areal capacity loading.

In further examples, high-capacity Si suffers from fast capacity decay due to the large volume expansion, which causes mechanical fracture, electrical contact loss and unstable solid electrolyte interphase (SEI). Nanostructuring has proved to be effective in addressing these problems over the past decade. However, new issues of high processing costs and poor Coulombic efficiencies still remain to be resolved.

Si, owning to its natural abundance and 10 times higher theoretical specific capacity than that of commercial graphite anode, has been widely considered as one of the most promising anode materials for the next-generation lithium-ion batteries (LIBs) with high energy density and long cycle life. However, Si suffers from fast capacity decay caused by the large volume expansion (~300%) during battery operation, which induces mechanical fracture, unstable solid electrolyte interphase (SEI) and loss of interparticle electrical contact.

Some attempts have been made to address these concerns using concepts of Si materials. For example, given that fracture toughness is highly improved when material size is decreased to the nanoscale, various nanostructures such as core-shell Si nanowires, porous Si, and Si/C composites have been developed. In addition, the design of an interior void space to accommodate volume expansion was demonstrated in hollow particle and tubes and further confirmed with the yolk-shell Si@void@C and pomegranate structures. Despite the impressive improvements achieved by these two concepts, new challenges were introduced: high-costs for the synthesis of nanostructured Si for stable cycling, and poor first- and/or later-cycle Coulombic efficiencies. A recent work on non-filling C—Si structures shows an improved later-cycle Coulombic efficiency, but still suffers from low initial Coulombic efficiency (ICE). The low ICE is caused by the severe electrode/electrolyte interfacial side reactions due to the large available surface area and the irreversible trapping of Li by the dangling bonds of the amorphous carbon coating.

What is needed is a pressure-resistant silicon structure that significantly improves mechanical stability, while providing void space to accommodate the volume expansion and greatly improving Coulombic efficiency.

SUMMARY OF THE INVENTION

To address the needs in the art, a battery electrode is provided that includes a porous silicon microstructure precursor, a silicon shell coating deposited on the silicon microstructure precursor, and a graphene coating deposited on the silicon shell coating, where the graphene coating encapsulates the silicon shell coating forming a graphene-encapsulated silicon-shell-protected porous silicon microstructure precursor battery electrode.

According to one aspect of the invention, the porous silicon microstructure precursor includes a Si mesoporous microparticle, or a cluster of Si nanoparticles.

In another aspect of the invention, the porous silicon microstructure precursor includes an annealed porous silicon microstructure precursor.

In a further aspect of the invention, the silicon shell coating includes a higher density than the density of the porous silicon microstructure precursor.

In yet another aspect of the invention, the silicon shell coating has a sealing-structure, where the sealing-structure is configured to prevent the electrolyte from diffusing to the porous silicon microstructure precursor and restricts formation of a solid electrolyte interface on a surface of the porous silicon microstructure precursor.

According to one aspect of the invention, the silicon shell coating includes a sealing-structure that is configured to sustain calendering process pressures, where the silicon shell coating includes a mechanical strength that is greater than a mechanical strength of the porous silicon microstructure precursor.

BRIEF DESCRIPTION OF THE DRAWINGS

FIGS. 1A-1C show the fabrication and merits of shell-protective secondary silicon nanostructures, that include: (1A) a scheme of the fabrication process; (1B-1C) Comparison of the SEI formation and calendering test between uncoated and Si shell coated Si NPs clusters; (1B) uncoated Si NPs cluster: electrolyte can diffuse into the inner pores, resulting in excessive SEI formation; the structure collapses easily during the calendering process, resulting in electrical contact loss; (1C) after Si shell coating: electrolyte is prevented from leaking into the interior space, thus restricting SEI formation to the outer surface; more impressively, the structure becomes highly pressure-resistant and maintains intact under 100 MPa, according to embodiments of the current invention.

FIG. 3A-3M show pressure-resistant property tests that include: (3A, 3E, 3I) schematic of uncoated (3A), 100 nm Si skin (3E) and 200 nm Si skin (3I) coated Si NPs cluster after calendaring; (3B-3D) SEM images of uncoated Si NPs cluster after being pressed under (3B) 0 MPa, (3C) 3 MPa, (3D) 15 MPa. (3F-3H), SEM images of 100 nm Si skin coated Si NPs cluster after being pressed under (3F) 0 MPa, (3G) 15 MPa, (3H) 60 MPa. j-l, SEM images of 200 nm Si skin coated Si NPs cluster after being pressed under (3J) 0 MPa, (3K) 60 MPa, (3L) 100 MPa. Scale bar for (3B-3D, 3F-3H and 3J-3L is 2 μm. (3M), Diagram of the fraction of unbroken spheres after being pressured as a function of applied pressure, according to the current invention.

FIG. 4A-4I show the electrochemical characterization, that includes all the specific capacities are reported based on the total mass of the active materials (Si and C in the Si NPs cluster@G and Si NPs cluster@Si@G microparticles). (4A) First-cycle voltage profiles of individual cells with corresponding Coulombic efficiencies. (4B) AC impedance spectra of as-produced Si microparticle film anode for the 1st cycle. To better evaluate the electrochemical performance of Si NPs cluster@Si@G microparticles, AC impedance spectra for the 100th cycle was also tested. (4C) Half-cell delithiation capacity of different products. For Si NPs cluster@G and Si NPs cluster@Si@G samples, no conductive additives were added. For bare Si NPs cluster@Si samples, super P was added as a conductive additive. The mass loading of active material was around 0.6 mg cm$^{-2}$. The rate was C/20 for the initial three cycles and C/2 for later cycles (1C=4.2 A g$^{-1}$). The Coulombic efficiency of the Si NPs cluster@Si@G is plotted on the secondary y-axis. (4D) schematic of the in situ TEM device. (4E, 4F) time-lapse images of the lithiation of (4E) Si NPs cluster@Si microparticles (also see Supplementary Video 1) and (4F) Si NPs cluster@Si@G microparticle (also see Supplementary Video 2). Scale bar for all the time-lapse images is 1 μm. (4G, 4H) cross-sectional SEM images of Si NPs cluster@Si without (4G) and with (4H) graphene-encapsulation. Electrodes before (left) and after (right) cycling test. (4I) Full-cell delithiation capacity of Si NPs cluster@Si@G microparticles paired with a traditional lithium cobalt oxide cathode. The Coulombic efficiency of the Si NPs cluster@Si@G microparticles is plotted on the secondary y-axis, according to the current invention.

FIGS. 6A-6M show fabrication and Characterization of: (6A) schematic of the fabrication process of Mp-Si@Si@G microparticles. SEM (6B-6E) and TEM (6F-6I) images of annealing-treated SiO microparticles (6B, 6F), Mp-Si microparticles (6C, 6G), Mp-Si@Si microparticles (6D, 6H), and Mp-Si@Si@G microparticles (6E, 6I). Insets are magnified SEM images showing the surface of the microparticles, scale bar is 500 nm. (6J), XRD patterns of annealing-treated SiO microparticles before and after HF-etching treatment. (6K, 6J) FIB-SEM characterization of Mp-Si microparticles without (6K) and with (6I) Si-sealing. (6M) high-resolution TEM image of the graphene cage's layered structure, according to the current invention.

Figure 2B:
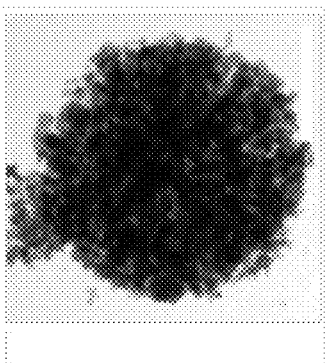
FIGS. 2A-2O show the morphology and structure characterization, that includes schematic (2A,2F, 2K), SEM (2B, 2C, 2G, 2H, 2L, 2M), FIB-SEM (2D, 2I, 2N) and TEM (2E, 2J, 2O) images of Si NPs cluster (2A-2E), Si NPs cluster@Si microparticles (2F-2J), Si NPs cluster@Si@G microparticles. Scale bar for images (2B, 2G and 2L) is 2 μm. Scale bar for other images is 1 μm. Inset in image (2N) is SEM image of one single Si NPs cluster@Si@G microparticle showing the surface of the microparticle, scale bar is 500 nm. Inset in image (2O) is high-resolution TEM image of the graphene cage's layered structure, scale bar is 20 nm, according to the current invention.
Figure 2G:
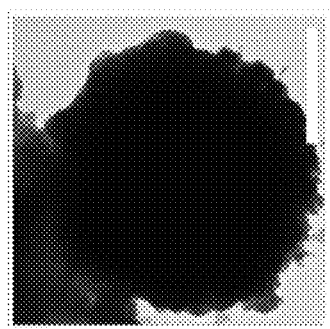
Figure 2L:
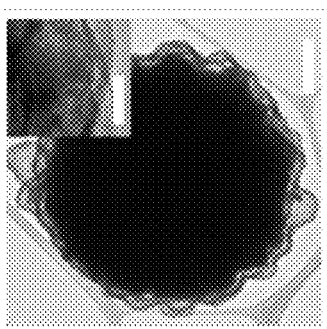
Figure 2C:
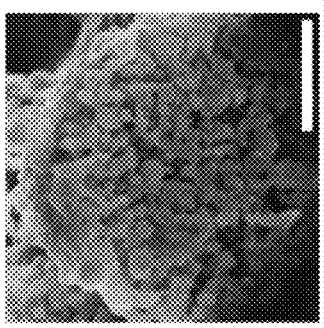
Figure 2H:
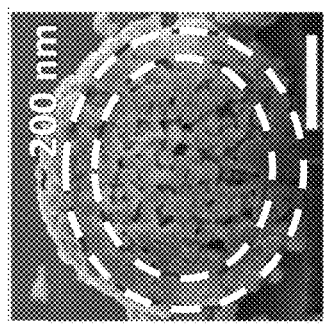
Figure 2M:
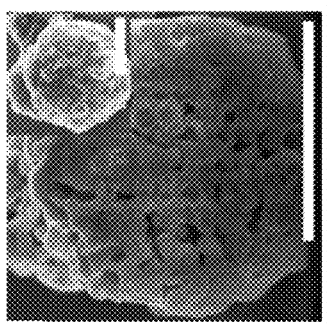
Figure 2D:
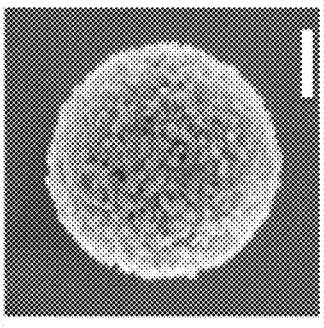

full-cell delithiation capacity of Mp-Si@Si@G microparticles paired with a traditional lithium cobalt oxide cathode. The Coulombic efficiency of the Mp-Si@Si@G microparticles is plotted on the secondary y-axis, according to the current invention.

DETAILED DESCRIPTION

To address the needs in the art, a battery electrode material is provided that includes a porous silicon microstructure precursor, a silicon shell coating deposited on the silicon microstructure precursor, and a graphene coating deposited on said silicon shell coating, where the graphene coating encapsulates the silicon shell coating forming a graphene-encapsulated silicon-shell-protected porous silicon microstructure precursor battery electrode. According to one embodiment, a pressure-resistant silicon hollow structure is provided by depositing silicon onto the silicon porous structure (precursor). The silicon shell significantly improves the mechanical stability, while the porous inner structure provides void space to overcome the volume expansion during the cycling. Such hollow structure can resist a high pressure and maintain well after calendering process. In addition, the silicon shell also decreases the surface area and thus greatly increases the initial Coulombic efficiency.

Some advantages of the high-performance materials according to the current invention lowering the accessible surface area and minimizing the side reactions. The current invention increases the initial Coulombic efficiency and increases the mechanical stability, and further increases tap density and volumetric capacity density where it is scalable and adaptable manufacturing. The invention can be incorporated with standard equipment and procedures, and can be used as a diffusion-controlled surface coating, or a condense coating layer. Other advantages of silicon anodes include the silicon sealing enables silicon to be used as a rechargeable anode material in batteries, with the following features: theoretical charge capacity over 10× greater than graphite (gravimetric) low potential vs. Li metal.

This technology is extended to coat on other anode materials including graphite, tin, germanium and oxides, etc. Besides sealing with silicon, the porous/hollow structure can also be coated with carbon, tin, germanium and oxides, etc.

In one aspect of the invention, provided is a surface-engineering strategy of depositing a dense Si skin onto each mesoporous Si microparticle precursor structure, and further encapsulating it with a conformal graphene cage. The Si skin lowers the accessible surface area and minimizes side reactions, resulting in an initial Coulombic efficiency over twice as high as that without Si skin coating. The graphene-encapsulation combined with the inner sufficient void space for Si expansion, guarantees the structural integrity and stable SEI formation, thus high later-cycle Coulombic efficiencies (99.8-100% for later cycles) and impressive cycling stability.

Coulombic efficiency provided by devices currently known in the art is still dissatisfactory, and the constructed microstructure often suffers from poor mechanical stability and collapses easily during the calendering process, limiting its application in the high-areal-capacity anodes fabrication. With the current invention, the porous silicon nanostructure is sealed by silicon via a CVD process, resulting in a condensed coating layer on the surface. This structure would overcome the volume expansion during the cycling process because of the porous inner structure. Moreover, the condensed coating layer decreases the surface area and minimizes the side reaction, thus increasing the first Coulombic efficiency. The coating layer also increases the mechanical stability and resists a high pressure of over 100 MPa and maintain well after calendering process, which is significant to the anode production.

According to the current invention, a pressure-resistant silicon structure is provided by designing a dense silicon shell coating onto secondary micrometer particles, each having many silicon nanoparticles. The silicon skin layer functions as a strong shell significantly improving mechanical stability, while the inner porous structure provides void space to accommodate the volume expansion. Such a structure can resist a high pressure of over 100 MPa and is well-maintained after the calendering process, demonstrating a high volumetric capacity of 2,041 mAh cm$^{-3}$. In addition, the dense silicon shell also decreases the surface area and thus greatly increases the initial Coulombic efficiency. Further encapsulated with a graphene cage, which allows the silicon core to expand within the cage while retaining electrical contact, the silicon hollow structure exhibits high 1$^{st}$ cycle Coulombic efficiency of 90.4% and fast rise of later Coulombic efficiencies to >99.5% and superior stability in a full-cell battery.

Turning now to the fabrication and merits of shell-protective secondary silicon nanostructures, the process flow on how we synthesize such a structure is shown in FIG. 1A. A bottom-up microemulsion approach was adopted to synthesize micro-sized silicon clusters from silicon nanoparticles. The exterior surface of each silicon cluster was then sealed with a dense silicon shell through a chemical vapor deposition (CVD) method, and further encapsulated by a highly conformal graphene cage through the electroless deposition of a Ni template and followed with CVD growth of graphene. After the Ni template was etched away, graphene-encapsulated silicon-shell-protected silicon hollow structures were obtained.

Such a novel design has multiple advantages: (1) the silicon shell significantly improves mechanical stability, rendering the structure able to resist a high pressure of 100 MPa and survive the calendering process (FIGS. 1B-1C), after calendering both electrical contact and volumetric capacity are improved; (2) the silicon shell also increases the tap density. The tap density increased from 0.14 g cm$^{-3}$ to 0.47 g cm$^{-3}$ after assembling the nanoparticles into clusters, and further increased to 0.79 g cm$^{-3}$ after Si shell coating; (3) the dense silicon shell prevents the electrolyte from diffusing to the interior pores and thus decreases side reactions and SEI formation, improving both the first- and later-cycle Coulombic efficiencies (FIGS. 1B-1C); (4) the inner porous structure provides void space to accommodate the large volume expansion, enabling good cycling stability; (5) a graphene cage outer coating is mechanically strong and flexible, it guarantees a stable interfacial layer with electrolyte and retains structural integrity during cycling.

Figure 2I:
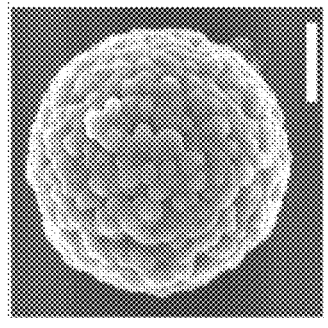
Figure 2N:
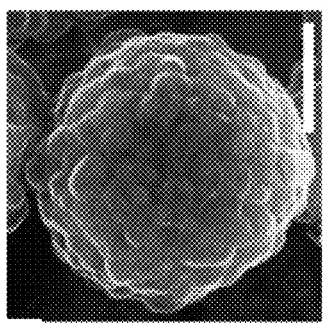
Figure 2E:
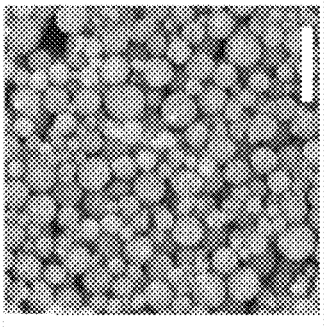
Figure 2J:
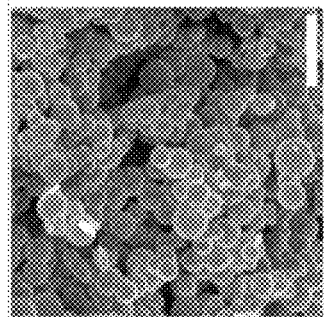
Figure 2O:
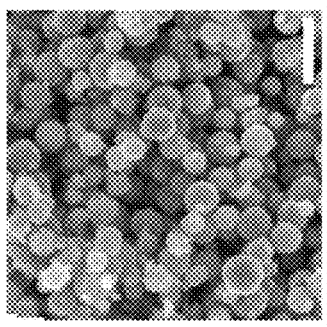
Figure 2A:
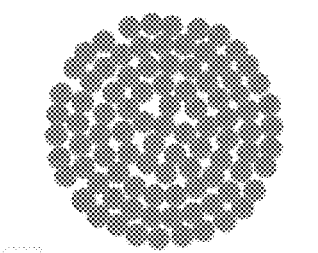
Figure 2F:
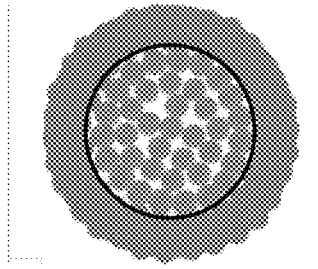
Figure 2K:
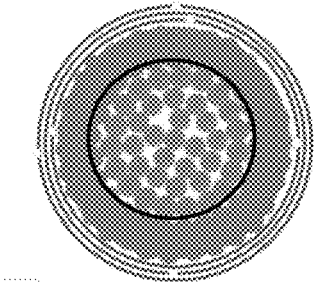

Regarding the morphology and structure characterization, the morphology and structure of the products obtained at different steps during the synthesis process are shown in FIGS. 2A-2O. The silicon clusters composed of silicon nanoparticles (Si NPs cluster) are highly spherical, ranging from 1 to 5 μm in diameter (FIGS. 2A-2E), and have many inner pores as clearly demonstrated by the focused ion beam (FIB)-scanning electron microscope (SEM) and transmission electron microscopy (TEM) images. A dense silicon shell is deposited onto each cluster (Si NPs cluster@Si) by CVD treatment. A well-defined silicon shell should be able to sufficiently seal the silicon cluster but still maintain the inner void space. After coating under a low pressure for a short time, both the inside and outside of the cluster are partially coated, allowing electrolyte to leak into the inside of the cluster from the unsealed pores, thus low initial Coulombic efficiency (ICE). However, after coating under a low pressure for a long time, both the inside and the outside of the cluster are fully sealed, leaving no void space to buffer the volume expansion, resulting in poor cycling stability. After coating under a higher pressure for a suitable time, the surface of the cluster is totally covered while the inner pores are barely sealed (FIG. 2I), thus preventing the electrolyte leaking in while still allowing the inside pores to butter the expansion of the structure during repeated charge/discharge cycles. The thickness of the outside silicon shell is ~200 nm, it only covers the outer layer of the particles, leaving the highly porous nature of the interior maintained. To better improve the electrochemical performance, the Si NPs cluster@Si microparticles were further encapsulated by a graphene cage. Each Si NPs cluster@Si microparticle was first coated with a layer of Ni, which not only catalyzes the growth of graphene at a low temperature but also serves as the sacrificial layer for providing void space. After Ni was etched away by $FeCl_3$ aqueous solution, graphene-encapsulated Si NPs cluster@Si microparticles were obtained as the final product (Si NPs cluster@Si@G) (FIGS. 2K-2O). To better verify the merits of our Si NPs cluster@Si@G microparticles, Si NPs clusters without silicon-shell-coating and only encapsulated with graphene cage (Si NPs cluster@G) were also prepared. The multilayered structure of the graphene cage can be clearly observed through the high-resolution TEM (HRTEM) images (see the image inserted in FIG. 2O). Raman spectroscopy also reveals the highly graphitic nature of the carbon shell, wherein the pronounced D band with a narrow bandwidth suggests that sufficient defects are present to facilitate Li-ion transport to silicon. Thermogravimetric analysis (TGA) reveals that the graphene cages make up only ~8% of the total mass of the Si NPs cluster@Si@G composite (~11% for Si NPs cluster@G composite). Here, the lower carbon content compared with previous works is presumed to minimize the irreversible trapping of Li ions by graphene structures and improve Coulombic efficiency without sacrificing the specific capacity.

Figure 3M:
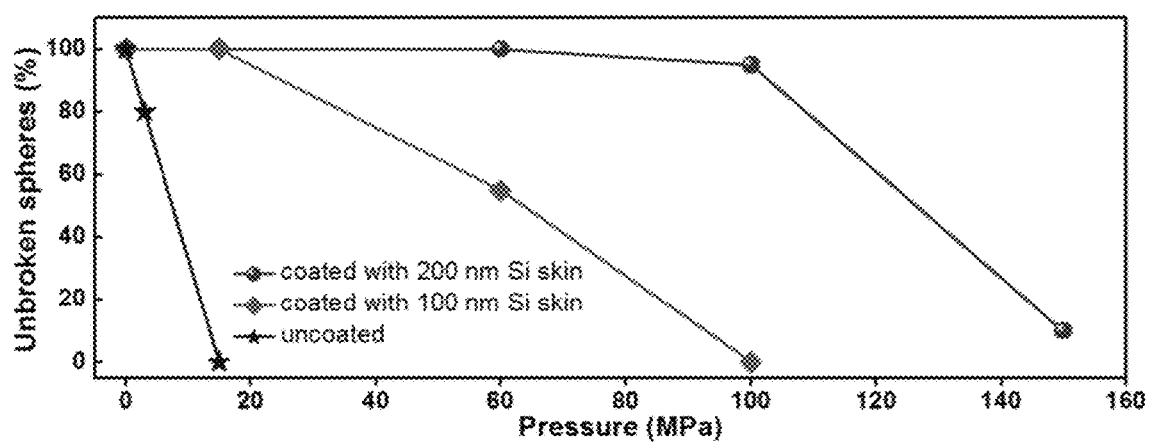

For a pressure-resistant property test, as mentioned above, the calendering process during battery electrode fabrication is highly important, which can increase the volumetric energy density, improve electrical contact, and increase adhesion between particles and current collector. Unfortunately, most previous hollow nanostructures suffer from poor mechanical stability and collapse easily during the calendering process, resulting in low volumetric energy density, electrical contact loss, poor cycling stability and limited practical application. According to the current invention, by depositing a dense silicon shell onto each silicon cluster, the particles' mechanical properties are greatly improved (FIGS. 3J-3M). The uncoated Si NPs clusters partially break under a quite low pressure of 3 MPa (about 20% of the clusters broke down, FIG. 3C) and totally collapse under 15 MPa (FIG. 3D). Conversely, after coated with 100 nm silicon shell, the particles hardly break under 15 MPa (FIG. 3G), however, about 45% collapse under 60 MPa (FIG. 3H). Impressively, after coated with 200 nm silicon shell, the structure and shape of the particles still remain barely changed even under a much higher pressure of 100 MPa (FIG. 3I). In addition, the results hold for a practical calendering process on Si NPs cluster@G microparticles and Si NPs cluster@Si@G microparticles. The structure of Si NPs cluster@Si@G microparticles remained intact after the calendering process, while Si NPs cluster@G microspheres totally collapsed, it obviously indicates the pressure-resistant superiority of these shell-protective secondary silicon nanostructures and their suitability for the fabrication of high-volumetric-capacity electrodes.

Regarding the electrochemical characterization, the shell-protective pressure-resistant silicon hollow structure of the current invention demonstrates remarkable electrochemical performance both in half-cell and full-cell configurations. Type 2032 coin cells were constructed for cycling tests from 0.01 to 1 V (half cell) and 3.0 to 4.2 V (full cell).

Figure 4A:
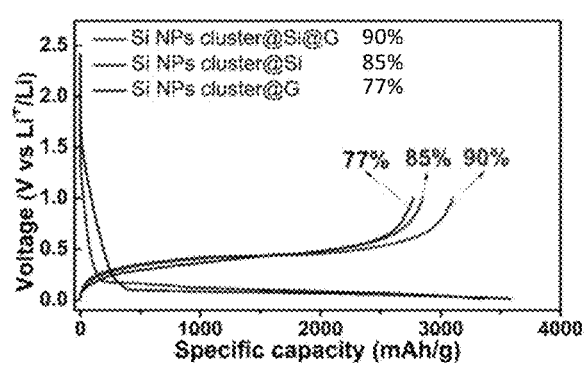

The voltage profiles for the first cycle of Si NPs cluster@Si@G, Si NPs cluster@Si and Si NPs cluster@G microparticle electrodes are compared in FIG. 4A. All of them exhibited typical electrochemical features of silicon. Impressively, the initial Coulombic efficiency of 90.4% of Si NPs cluster@Si@G microparticle electrode is superior to that of the other two electrodes. It is worth noting that Coulombic efficiency is one of the most important parameters to evaluate the performance of a battery, especially those of the early cycles, which account for most of the Li-ion loss and electrolyte consumption. Surprisingly, compared to other high-performing nano-Si anodes that usually need many cycles to reach 99%, the Coulombic efficiency of Si NPs cluster@Si@G microparticles is beyond 99% after only 8 cycles (FIG. 4C) and is maintained at a high level thereafter (99.5-100%).

Figure 4B:
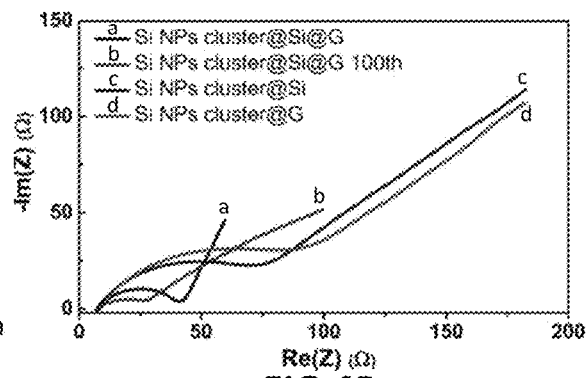

There are two characteristics of the pressure-resistant Si hollow structures that contribute to the improvement in early- and later-cycle Coulombic efficiencies: the surface chemistry allows initial SEI formation without consuming too much lithium, and the mechanically stable electrode/electrolyte interface prevents additional SEI formation. Firstly, the silicon shell greatly decreases the surface area accessible by the electrolyte, thus minimizing possible side reactions and irreversible Li-consumption. The specific surface area of Si NPs cluster@Si is about five times lower than that of silicon nanoparticles (5.6 vs 29.3 $m^2/g$) (the actual contact area between uncoated Si NPs clusters electrode and electrolyte is similar to that between Si nanoparticles and electrolyte, given that uncoated Si NPs clusters collapse to nanoparticles after the calendering process), resulting in less SEI formed and higher ICE achieved. Secondly, the encapsulation of Si NPs cluster@Si microparticle with mechanically strong graphene cages guarantees a stable electrode/electrolyte interface and prevents additional SEI formation. Furthermore, Si NPs cluster@Si@ G microparticles electrode exhibits much faster kinetics than the other electrodes and displays excellent stability even after 100 cycles (FIG. 4B, electrochemical impedance spectroscopy test), it demonstrates that the SEI layer remains stable during the whole cycling of the Si NPs cluster@Si@G microparticles electrode, enabling high later-cycle Coulombic efficiencies.

Figure 4C:
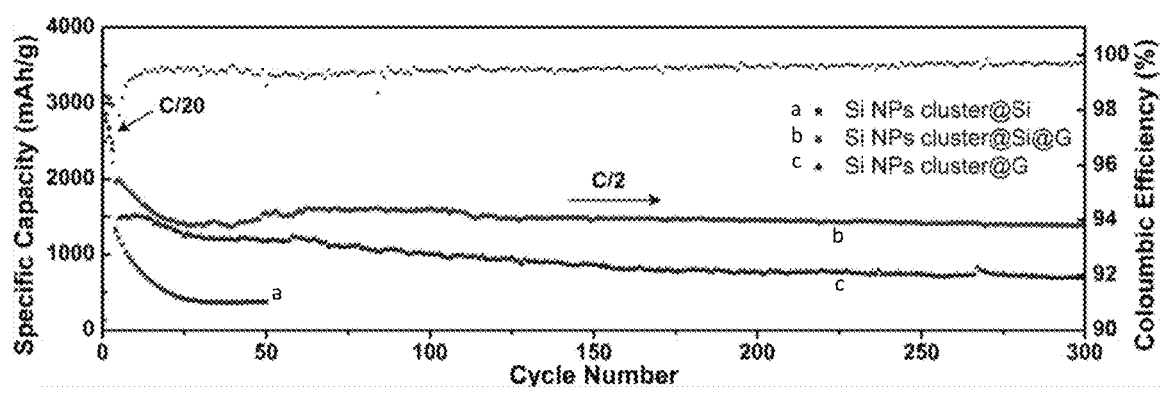

The specific capacity and cycling stability are another two very important parameters for the evaluation of a practical battery. As shown in FIG. 4C, a reversible capacity of about 3,096 mAh $g^{-1}$ at a current density of C/20 (1C=4.2 A $g^{-1}$) was achieved by Si NPs cluster@Si@ G microparticle electrodes. If not mentioned, all reported capacities are based on the total mass of Si and C in the composite. Considering that silicon is 92% of the mass of the composite, the specific capacity with respect to silicon is as high as 3,365 mAh $g^{-1}$. The volumetric capacity was calculated to be 2,041 mAh $cm^{-3}$, which is more than five times the 600 mAh $cm^{-3}$ obtained by graphite anodes. The high capacity indicates that the active materials are electrically well connected and participate fully in the electrochemical lithiation/delithiation process. Furthermore, a specific capacity of about 1,388 mAh g$^{-1}$ was maintained after 300 consecutive cycles at a high rate of C/2, which is still over three times as large as that of commercial graphite anodes' theoretical capacity (372 mAh g$^{-1}$) and far surpasses that of Si NPs cluster@Si (373 mAh g$^{-1}$ at the 50th cycle) and Si NPs cluster@G (689 mAh g$^{-1}$ at the 300th cycle).

The superior electrochemical stability can be ascribed to two merits of the Si NPs cluster@Si@G composite: (1) the porous inner structure provides void space to accommodate the volume expansion during the cycling; (2) the graphene shell which acts as a mechanically strong and flexible buffer during deep galvanostatic cycling, limits the microparticles to expand mainly towards inside and maintains electrical contact, thus improving the cycling stability.

To verify the compatibility of our Si NPs cluster@Si@G structure with the drastic volume expansion of Si lithiation, an in situ TEM study comparing the Si NPs cluster@Si and the Si NPs cluster@Si@G microparticles was performed. The Si NPs cluster@Si microparticle apparently expands towards both inside and outside during the lithiation process, the random and vigorous expansion finally induces the fracture of the structure. For the Si NPs cluster@Si@G microparticles, the mechanically strong graphene cage limits the inner silicon particle to expand mainly towards inside and guarantees the integrity of the structure during the whole lithiation process, thus leading to a good cycling stability.

To further investigate the reason for such a good cycling stability, post-cycling cross-sectional SEM analyses are carried out to check the morphology change of the silicon electrodes after charge/discharge. As shown by the inserted images in FIG. 4G and FIG. 4H, the spherical shape of Si NPs cluster@Si microparticles become irregular after cycling, indicating an intensive volume expansion and structural cracking; conversely, Si NPs cluster@Si@G microparticles remain spherical and intact after cycling, indicating good stability. Moreover, the volume expansion of the Si NPs cluster@Si@G microparticles electrode is calculated to be only 13.7% (~81.4% for Si NPs cluster@Si microparticles).

Besides half-cells, a full cell with high mass loading and areal capacity was constructed to better characterize the pressure-resistant property and good cycling stability of the Si NPs cluster@Si@G composite. The areal capacity of the silicon anode and traditional lithium cobalt oxide (LCO) cathode are initially matched (Li-matched). As FIG. 4I shows, the Si NPs cluster@Si@G microparticles electrode exhibits stable cycling (2.1 mAh cm$^{-2}$ remained after 100 cycles) and high Coulombic efficiency (99.7% average after the fifth cycle) at a current density of 1.4 mA cm$^{-2}$.

Demonstrated herein is a multifunctional silicon shell coating on secondary silicon nanostructures, which not only significantly improves the mechanical stability of silicon structures to be resistant to a high pressure of 100 MPa and achieve a superior volumetric capacity of 2,041 mAh cm$^{-3}$, but also decreases the accessible surface area and prevents excessive SEI formation to achieve highly increased initial Coulombic efficiency. In addition, the silicon shell only wraps the outside surface of the silicon structure, retaining the porous inner structure to provide void space for buffering the volume expansion during the cycling, resulting in improved cycling stability. After further encapsulation with a graphene cage, which limits the silicon microparticles to expand mainly towards inside and maintains electrically connected, these shell-protective silicon secondary nanostructures exhibit high Coulombic efficiencies and good stability even in a full-cell battery cycling. This remarkable high-volumetric-capacity and cycling stability for micro-sized silicon anode materials demonstrate the promising application of our shell-protective pressure-resistant silicon hollow structures in the lithium battery industry.

Turning now to the microemulsion-based assembly of Si nanoparticles into clusters. Here, 10 g Si nanoparticles (SiNPs, ~80 nm, MTI, Inc.) were first dispersed in 500 mL water (~2 wt % of Si in water) by ultrasonication. The obtained water dispersion of Si (25 mL) was mixed with 100 mL 1-octadecene (ODE, Aldrich) solution containing 0.6 wt % of emulsion stabilizer (amphiphilic block copolymer, Hypermer 2524, Croda USA) and homogenized at 7000 rpm for 1 min. The mixture was then heated at 95~98° C. for 4 hours. After evaporation of water, the Si nanoparticle clusters were collected by centrifugation, and washed with cyclohexane once. The final powder was calcined at 800° C. for 2 hours in argon to remove the organics and stabilize the cluster.

Regarding the synthesis of silicon-sealed Si NPs cluster (Si NPs cluster@Si) microparticles, Si nanoparticles clusters (Si NPs clusters) were sealed with silicon through a chemical vapor deposition (CVD) method. In a typical process, Si NPs clusters were transferred to a tube furnace (Thermo Electron Corporation), which was then purged with high-purity Ar gas. Then the tube was heated to 550° C. with a heating rate of 50° C./min. Afterwards, both pure Ar gas and silane gas were introduced into the tube with a total pressure of 40-100 torr, while the partial pressure of silane is 0.3 torr/jump. After reacting at 550° C. for 15-60 min, silane gas was cut off, and let the tube cool down under Ar atmosphere. Finally, the Si-sealed mesoporous silicon microparticles were collected after the temperature was below 50° C.

For the synthesis of graphene-encapsulated Si NPs cluster@Si (Si NPs cluster@Si@G) microparticles, to obtain a conformal Ni coating, the surface of Si NPs cluster@Si microparticles must be densely coated with a nucleation seed (Pd in this case). As a surface-adherent layer, (3-Aminopropyl)triethoxysilane (APTES) was used to sensitize the Si surface with —NH$_2$ group, which subsequently reduced the Pd metal seed from solution onto Si.

1 g as-prepared Si NPs cluster@Si microparticles was dispersed in 100 ml isopropanol and sonicated for about 15 min. 1 ml APTES (99% pure, Sigma-Aldrich) and 100 ul distilled water were sequentially added to the isopropanol solution and stirred at 70° C. for 1 h. After that, a very thin layer of —NH$_2$ groups was formed at the surface of the Si microparticles. The sample was collected by centrifugation and then washed three times with DI water. Then the particles were immersed in 30 ml palladium chloride aqueous solution (0.5 g/L PdCl$_2$; 2.5 ml/L concentrated HCL; Sigma-Aldrich) and stirred for 15 min. After washing three times with DI water, activated Si NPs cluster@Si microparticles were obtained.

Two electroless Ni solutions were prepared: a primary solution (20 g/L nickel sulphate hexahydrate; 10 g/L sodium citrate dihydrate; 5 g/L lactic acid) and a secondary solution with double the component concentration (40 g/L nickel sulphate hexahydrate; 20 g/L sodium citrate dihydrate; 10 g/L lactic acid). Activated Si NPs cluster@Si microparticles were sequentially immersed in these EN solutions.

Before the first electroless deposition, 2 g of dimethylamine borane (DMAB; Sigma-Aldrich) and 2 ml of ammonium hydroxide (NH$_3$·H$_2$O, Sigma-Aldrich, 28%) were added to 360 ml of the primary EN solution. The pH-sensitive DMAB served as the reducing agent during electroless Ni deposition. 1 g of activated Si NPs cluster@Si microparticles was then added to the primary EN solution and gently stirred for about 30 min. Bubbles began to appear and the green-colored EN solution became lighter in color as the reaction proceeded. After deposition was complete, the Si NPs cluster@Si@ 1×Ni settled to the bottom. While holding the Si NPs cluster@Si@ 1×Ni particles at the bottom of the container with a magnet, the depleted EN bath was carefully poured out. In a separate container, 4 g of DMAB and 4 ml of ammonium hydroxide were added to 360 ml of the secondary EN solution. This was then added immediately to the damp particles (Si NPs cluster@Si@ 1×Ni) and stirred for another 30 min. The resulting Si NPs cluster@Si@2×Ni particles were washed twice with ethanol.

For graphene-encapsulation, Si NPs cluster@Si@2×Ni particles were dispersed in 150 ml triethylene glycol (Santa Cruz Biotechnology) and 500 ml NaOH aqueous solution (50%, w/w). After stirring at 185° C. for 8 h, the carburized Si NPs cluster@Si@2×Ni particles were collected by centrifugation and washed three times with ethanol. The carburization process occurred when the organic solvent decomposed, allowing carbon atoms to diffuse into the Ni layer and adhere to the surface. This primes the Si NPs cluster@Si@2×Ni particles for low-temperature graphene growth. Samples were then dried in a vacuum oven at 50° C. for 1 h. The dried particles were placed in a tube furnace with the following temperature profile: heat to 450° C. at 15° C./min; hold temperature at 450° C. for 1 h. An Ar flow rate of 80 sccm was maintained throughout the annealing process. The dual-purpose Ni template were etched away by immersing the annealed particles in 1 M FeCl$_3$ (2 hours) aqueous solution. Graphene-encapsulated Si NPs cluster@Si microparticles were obtained after washing three times with 1M HCL aqueous solution and DI water and drying in a vacuum oven at 60° C. for 1 hour.

Regarding materials characterization, the weight percentages of Si and C in Si NPs cluster@Si@G and Si NPs cluster@G were determined from the weight loss curves measured under simulated air atmosphere (20% O$_2$+80% Ar) on a TG/DTA instrument (Netzsch STA 449) with a heating rate of 5° C./min. Under these conditions, mass increases due to slight Si oxidation, whereas carbon oxidation to gaseous species causes mass loss. To decouple these two processes, a bare Si control sample was measured at the same heating conditions and the mass gain was subtracted from the Si NPs cluster@Si@G and Si NPs cluster@G curves. Other characterizations were carried out using scanning electron microscopy (FEI Sirion, Nova NanoSEM), transmission electron microscopy (FEI Tecnai, Titan), X-ray photoelectron spectroscopy (SSI S-Probe Monochromatized, Al Kα radiation at 1486 eV), electrochemical impedance spectroscopy (BioLogic VMP3), and Raman spectroscopy (Horiba JY).

For the in situ TEM characterization, a piezo-controlled, electrical biasing TEM-AFM holder (Nanofactory Instruments) was used to observe the lithiation process of Si NPs cluster@Si@G and Si NPs cluster@Si microparticles. Lithium metal and silicon microparticles were dispersed onto 0.25 mm W and Cu wires, respectively. They were then brought into contact by the piezo-controller. By applying a voltage bias of −3 V, Li ions flowed through the Li metal's native oxide/nitride to alloy with Si at the working electrode. The graphene cage remained intact along with the whole lithiation process.

In the electrochemistry characterization, working electrodes were all prepared using a conventional slurry method. Si NPs cluster@Si@G powders and polyvinylidene fluoride (PVDF, Kynar HSV 900) binder with a mass ratio of 9:1 were dispersed in N-methyl-2-pyrrolidone (NMP) and stirred for 12 h. Control electrodes with bare Si NPs cluster@G, or Si NPs cluster@Si were prepared using the same slurry method, except using a mass ratio of 8:1:1 for active material (Si NPs cluster@G, or Si NPs cluster@Si), carbon black conductive additive (Super P, TIMCAL, Switzerland), and PVDF binder, respectively. After casting onto a 15 µm-thick Cu foil and drying at 60° C. in a vacuum oven for 12 h, the samples were calendered and cut into 1 cm$^2$ circular disks with a mass loading of 0.6-2.0 mg cm$^{-2}$. In an Ar-filled glovebox, these working electrodes were assembled into type 2032 coin cells with a polymer separator (Celgard 2250) and Li metal (Alfa Aesar) as the counter/reference electrode (half cell) or lithium cobalt oxide (LCO) as the cathode (full cell). 100 µl of 1.0 M LiPF6 in 89 vol % 1:1 w/w ethylene carbonate/diethyl carbonate (BASF Selectilyte LP40) with 10 vol % fluoroethylene carbonate and 1 vol % vinylene carbonate (Novolyte Technologies) was added as the electrolyte with full wetting of both working and counter electrode surfaces. Coin cells were loaded into a battery test (Land Instruments) and cycled between 0.01 and 1 V (half cell) or from 3.0 to 4.2 V (full cell). The Si anode in the full cell was prepared exactly as described for the half-cell experiments and did not undergo any pre-cycling or pre-lithiation before being used in the full cell. The specific capacity for all cells was calculated using the total mass of the graphene-encapsulated Si NPs cluster@Si composite. Charge/discharge rates were calculated assuming silicon's theoretical capacity (4,200 mAh g$^{-1}$ Si). Coulombic efficiency was calculated using the ratio of delithiation ($C_{dealloy}$) capacity to lithiation ($C_{alloy}$) capacity ($C_{dealloy}/C_{alloy}×100\%$). For ex situ SEM/TEM characterization of working electrodes, coin cells were charged to 1 V and disassembled. The working electrodes were then rinsed gently in acetonitrile to remove Li salts from the residual electrolyte.

Figure 5A:
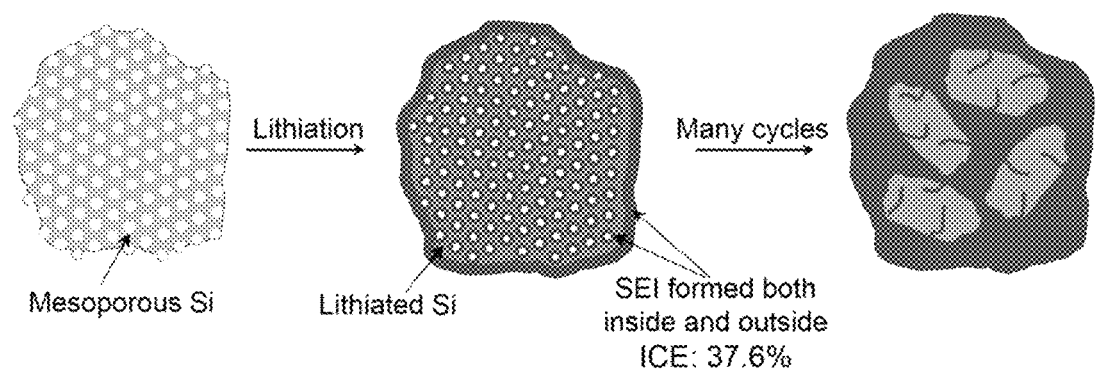
FIGS. 5A-5B show the design of Si skin coating on mesoporous Si microparticles, (5A) without Si skin coating, electrolyte diffuses into the inner pores, resulting in excessive SEI formation both inside and outside, and low initial Coulombic efficiency (ICE) of 37.6%, and (5A) after Si skin coating, electrolyte is prevented from diffusing into the interior space, thus restricting SEI formation to the outer surface, and highly improved ICE of 87.5%, according to the current invention.
Figure 5B:
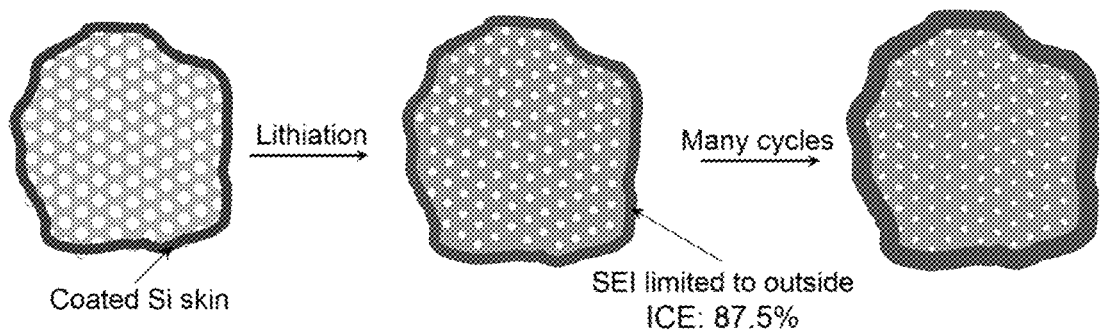

Turning now to another embodiment of the invention, which includes a surface-engineered Si mesoporous microparticle to greatly improve the Coulombic efficiencies. A mesoporous Si microparticle is obtained by thermal disproportionation of SiO microparticles and then removal of the SiO$_2$ by-products, each mesoporous Si microparticle is first coated by a Si shell and then encapsulated with a graphene cage. Such a design offers multiple attractive advantages: (1) The Si shell prevents the electrolyte from diffusing into the interior and restricts SEI formation to the outer surface (FIGS. 5A-5B), thus resulting in a highly improved initial Coulombic efficiency (Table 1, 37.6%, 87.5%, before and after Si skin coating); (2) the non-filling Si shell retains internal void space to accommodate the volume expansion, thus good cycling stability; (3) the graphene cage's intrinsic high electronic conductivity and ionic permeability through defects endow Si microparticles with an electrochemical active surface; (4) the SEI is expected to form mainly on the mechanically strong and flexible graphene cage, inducing stable SEI formation and resulting in improved later-cycle Coulombic efficiencies; and (5) SiO microparticles are commercially available and inexpensive, making the anode material cost-effective and scalable.

TABLE 1

Summary of specific surface area, total pore volume and lithium-ion battery performance for different products. Specific surface area was calculated from Brunauer-Emmett-Teller (BET) data from 0.05-0.20

| Sample | Specific surface area (m²/g) | Total pore volume (cm³/g) | Initial Coulombic efficiency (%) | Initial lithiation capacity (mAh/g) | Initial delithiation capacity (mAh/g) | Delithiation capacity of the 300$^{th}$ cycle (mAh/g) |
|---|---|---|---|---|---|---|
| Mp-Si | 229 | 0.28 | 37.6 | 3338 | 1256 | — |
| Mp-Si@G | — | — | 70.3 | 3218 | 2264 | 792 |
| Mp-Si@Si | 1.9 | 0.028 | 87.5 | 3084 | 2698 | 534 |
| Mp-Si@Si@G | — | — | 88.7 | 3197 | 2834 | 1246 | using Quantum software analysis system.

Regarding the material fabrication and characterization of the current embodiment, FIG. 6A shows the synthesis process of our surface-engineered mesoporous Si microparticles. Commercially available SiO particles (~325 mesh) were first ball-milled to decrease the size to 1-6 um. These SiO particles were then annealed at 950° C. for 10 h under Ar atmosphere. During the annealing process, the thermal disproportionation of SiO and subsequent phase separation occurs to form interconnected Si NPs embedded in a $SiO_2$ matrix. After removing the $SiO_2$ matrix with HF solution, mesoporous Si (Mp-Si) microparticles were obtained. Then a dense Si skin was deposited onto each Mp-Si microparticle through a chemical vapor deposition (CVD) method, resulting in Si skin sealed mesoporous Si (Mp-Si@Si) microparticles. These Mp-Si@Si microparticles were further encapsulated by highly conformal graphene cages through an electroless deposition of Ni template followed by CVD growth of graphene. The Ni serves as both the catalyst for graphene growth and the sacrificial template layer for providing void space. After a low-temperature (450° C.) annealing treatment, graphene grows on the Ni-coated Mp-Si@Si microparticles through a dissolution precipitation mechanism. Finally, the Ni catalyst was etched away using $FeCl_3$ aqueous solution, resulting in graphene cage encapsulated Si skin sealed mesoporous Si (Mp-Si@Si@G) microparticles.

Representative transmission electron microscopy (TEM) and scanning electron microscopy (SEM) images of products obtained at different steps in the synthesis process are shown in FIGS. 6B-6M. The heat-treated SiO microparticles have sizes of 1-6 um and smooth surfaces as shown in the inserted enlarged SEM images (FIG. 6B). The interconnected feature of Si NPs with size below 10 nm embedded in a $SiO_2$ matrix can be clearly observed from the TEM (FIG. 6I) and high-resolution TEM (HRTEM) images. The distinct lattice fringes with a d-spacing of 3.2 Å (111) indicate the crystalline nature of Si NPs, whereas the neighboring amorphous material is $SiO_2$. X-ray diffraction (XRD) characterization further verified that the SiO microparticles converted to nanocrystalline Si (JCPDS Card No. 27-1402) with an average size of ~8 nm (estimated by the Debye-Scherrer equation) and amorphous $SiO_2$ (FIG. 6J) after annealing, which agrees with the HRTEM results. X-ray photoelectron spectroscopy (XPS) also shows the coexistence of Si and $SiO_2$ in the annealed SiO particles: the peak observed at ~99 eV corresponds to the binding energy of Si(0), while the peak centered at ~103 eV suggests the presence of $SiO_2$.

After the removal of $SiO_2$ by HF-etching, a crystalline Si framework was obtained (FIGS. 6c, 6J 6K). XRD patterns show significant suppression of the broad $SiO_2$ peak after HF-etching, while the remaining weak $SiO_2$ bump in XPS spectrum may be caused by natural oxidation in air. The surface roughness of the microparticle increases greatly after etching (FIG. 6C) and the highly porous structure is clearly observed by TEM (FIG. 6G) and focused ion beam SEM (FIB-SEM) images (FIG. 6K). After 100 nm Si skin sealing, the particles become smooth again (FIG. 6D). Impressively, the highly mesoporous inner structure remained, indicating that the Si skin only wraps the outer layer of the particles (FIG. 6L).

To better improve the electrochemical performance, the Mp-Si@Si microparticle was further encapsulated by a graphene cage (FIGS. 6E, 6I, 6M). Besides, Mp-Si microparticle without Si skin but encapsulated with graphene cage (Mp-Si@G) is also prepared. Apparently, the graphene cage exhibits a wavy structure, which is due to conformal graphene growth along the large grains of Ni deposited on the Si microparticle. The highly graphitic nature of the graphene cage is demonstrated by the clearly observed multilayered structure (FIG. 6M), and further confirmed by Raman spectroscopy, wherein the pronounced D band with a narrow bandwidth suggests that sufficient defects are present to facilitate Li-ion transport to Si. Thermogravimetric analysis (TGA) reveals that the graphene cages make up only ~8% of the total mass of the Mp-Si@Si@G composite (~10% for Mp-Si@G composite). The lower carbon content compared with previous work is assumed to minimize the irreversible trapping of Li ions by the graphene structure and improve Coulombic efficiency without sacrificing the specific capacity.

Figure 7A:
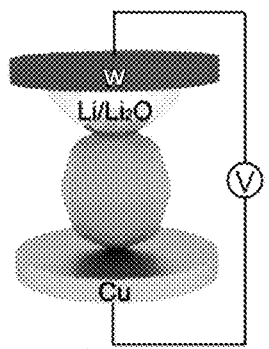
FIGS. 7A-7D show in situ TEM characterization during lithiation: (7A, 7C), schematic of the in situ TEM device, (7B, 7D) time-lapse images of the lithiation of dense Si microparticles (see Supplementary Movie 1) and Mp-Si@Si@G microparticle (see Supplementary Movie 2), (7B) for dense Si microparticles, the Si structures fractured violently due to the huge volume expansion, and the fractured pieces scattered randomly and lose contact from each other, (7D) for Mp-Si@Si@ G microparticle, the Si structure remains good because the inner pores can provide sufficient space to accommodate the expansion. During the whole lithiation process, the Si microparticles stay within the mechanically strong graphene cage, which remains intact throughout the highly anisotropic process, according to the current invention.
Figure 7B:
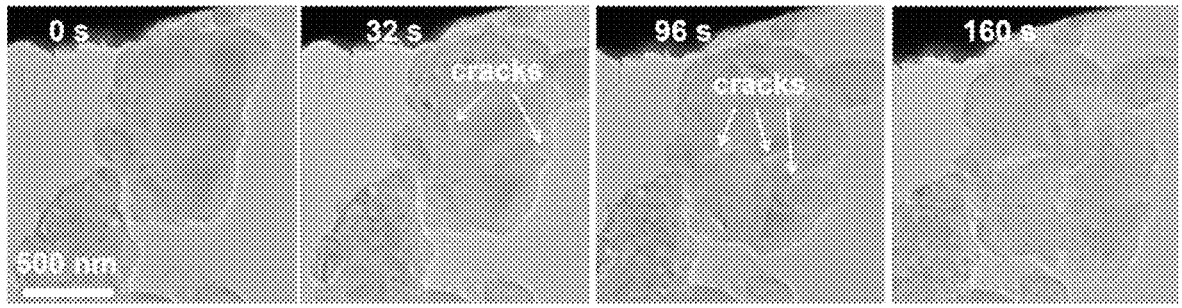
Figure 7C:
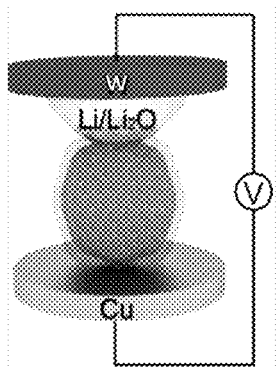
Figure 7D:
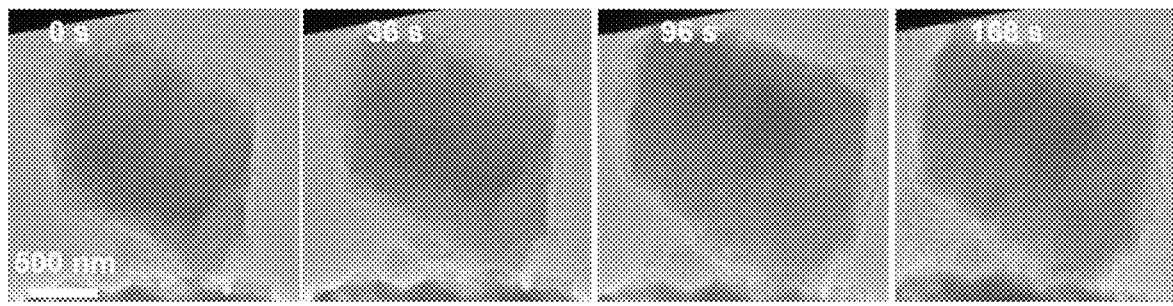

For in situ lithiation of Mp-Si@Si@G microparticles, a sufficient internal void space is necessary to maintain the structural integrity of the Si anode. To verify the compatibility of our Mp-Si@Si@G structure with the drastic volume expansion of Si anode, an in situ TEM study for the lithiation of Mp-Si@Si@G microparticles was performed and compared with the lithiation of dense Si microparticles (FIGS. 7A-7D). The electrochemical cells for the in situ TEM study are shown schematically in FIG. 7A and FIG. 7C. A series of images were taken at certain intervals from a movie recording the in situ lithiation process of Si anodes to monitor their structure changes. An apparent volume expansion of the dense Si microparticle was observed (FIG. 7B), cracks appeared after only 32 s and widened with prolonging time. At 160 s, the dense Si microparticle fractured vigorously to smaller particles. In contrast, the structural integrity of Mp-Si@Si@G microparticle is well-maintained through the whole lithiation process (FIG. 7D). At 0 s (before lithiation), the surrounding graphene shell is clearly observed outside the inner Si microparticle. The Si microparticle expands in volume when Li ions diffuse through the outer graphene shell and alloys with Si. The full lithiation of the Si microparticle achieved around 168 s as indicated by the minor TEM contrast change of graphene shell after that point. The whole structure remains well-intact even after full-lithiation, which is benefited from that the inner sufficient pore space of the Mp-Si@Si@ G microparticle can accommodate the large volume expansion, and the mechanically strong graphene cage limits the Si core to expand mainly inside. These results indicate that this well-designed mesoporous-core@Si-skin@graphitic-cage structure can effectively prevent the Si anode from structural breaking upon lithiation and thus improving the cycling life of the battery.

Regarding the electrochemical performance, the advantages of our Mp-Si@Si@G microparticles were further verified by electrochemical tests both in half-cell and full-cell configurations. Type 2032 coin cells were constructed for deep galvanostatic cycling tests from 0.01 to 1 V (half cell, 0.01 to 2.0 V for the first three activating cycles) and 3.0 to 4.2 V (full cell). All reported capacities are based on the total mass of Si and C in the composite.

Figure 8A:
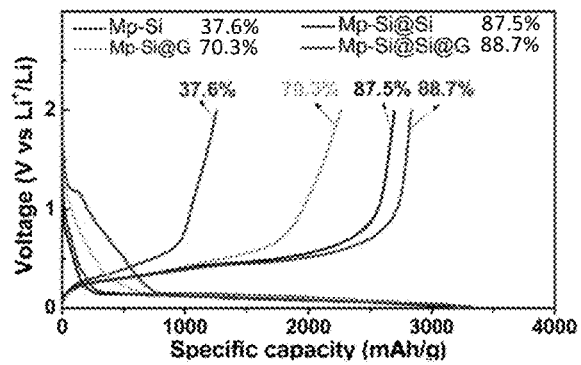
FIGS. 8A-8F show the electrochemical characterization, where all the specific capacities are reported based on the total mass of the active materials (Si and C in the Mp-Si@G and Mp-Si@Si@G), (8A) first-cycle voltage profiles of individual cells with corresponding Coulombic efficiencies, (8B) AC impedance spectra of as-produced Si microparticle electrodes for the 1st cycle. To better evaluate the electrochemical performance of Mp-Si@Si@G microparticles, AC impedance spectra for the 100th cycle was also tested, (8C) half-cell delithiation capacity of Mp-Si with different surface-engineering treatment. For Mp-Si@G and Mp-Si@Si@G samples, no conductive additives were added. For bare Mp-Si and Mp-Si@Si samples, super P was added as a conductive additive. The mass loading of active material was around 0.68 mg cm$^{-2}$. The rate was C/20 for the initial three cycles and C/2 for later cycles (1C=4.2 A g$^{-1}$). The Coulombic efficiency of the Mp-Si@Si@G is plotted on the secondary y-axis. (8D, 8E) Cross-sectional SEM images of Mp-Si@Si (8D) and Mp-Si@Si@G (8E) electrodes before (left) and after (right) cycling test, (8F)

Coulombic efficiency is one of the most important parameters to evaluate the performance of a battery, especially in the early cycles, which account for most of the Li-ion loss and electrolyte consumption during SEI formation. As shown in FIG. 8A and Table 1, the initial Coulombic efficiency of Mp-Si@Si@G microparticles is superior to any other intermediate products, reaching 88.7%. The poor ICE of mesoporous Si microparticles (37.6%) is because of their large specific surface area (229 m$^2$/g, as shown in Table 1), which causes lots of side reactions and a large amount of irreversible Li-consumption. After sealing by a dense Si skin, the specific surface area decreased to only 1.9 m$^2$/g and ICE greatly improved to 87.5%, benefited from the reduced side reactions and decreased SEI formation. After further encapsulation with the graphene cage, the ICE of Mp-Si@Si@G microparticles reaches 88.7%, which is over two times as high as that of the initial Mp-Si microparticles. More interestingly, distinct to other high-performing nano-Si anodes that usually need many cycles to reach above 99%, the Coulombic efficiency of Mp-Si@Si@G microparticles reached above 99% after only 7 cycles (FIG. 8C) and kept at a high level thereafter (99.8%-100%).

The improvement in early- and later-cycle Coulombic efficiencies can be explained in two parts: the surface chemistry allows initial SEI formation without consuming too much Li, and the mechanically stable electrode/electrolyte interface prevents additional SEI formation. Firstly, the Si skin greatly lowers the surface area accessible by the electrolyte, thus minimizing possible side reactions and irreversible Li-consumption. This can be verified by the cyclic voltammetry results: for the Mp-Si sample, an obvious reduction peak at about 1.15 V corresponding to the irreversible reactions between Li and surficial SiO$_x$ formed during the slurry preparation process is observed; conversely, no obvious cathodic peak of irreversible reactions can be observed for the Mp-Si@Si sample. Moreover, a plateau at about 1.2 V ascribed to the lithiation of SiO$_x$ is only observed for the voltage profile of the Mp-Si sample (FIG. 8A), further indicating the highly decreased irreversible Li-consumption by surficial Si-sealing.

Figure 8B:
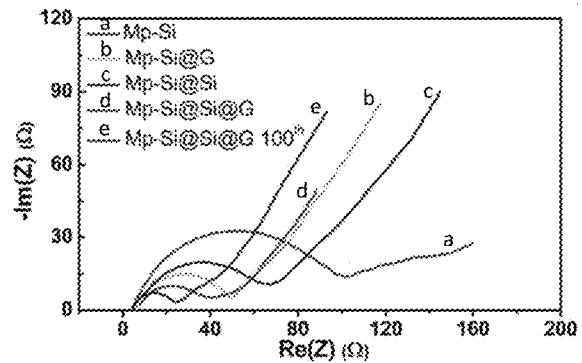

Secondly, the encapsulation of Mp-Si@Si with elastic graphene cages guarantees the formation of a stable electrode/electrolyte interface and prevents uncontrolled SEI formation. The Nyquist plot obtained from electrochemical impedance spectroscopy (EIS) test (FIG. 8B) indicates a much faster kinetics of Mp-Si@Si@G microparticles and excellent stability even after 100 cycles. Along with high later-cycle Coulombic efficiencies (FIG. 8C, 99.8-100.0%), the EIS data provide strong evidence for a stable SEI layer during cycling of the Mp-Si@Si@G microparticles.

Figure 8C:
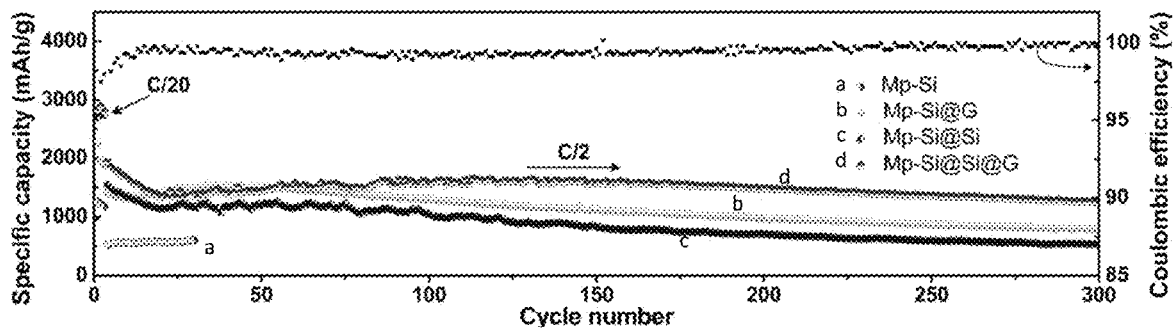

Besides the Coulombic efficiency, the specific capacity and cycling stability are another two most important parameters for a practical battery. The half-cell data in FIG. 8C shows that the Mp-Si@Si@G microparticles reached an initial reversible capacity of about 2834 mAh g$^{-1}$ at a current density of C/20 (1C=4.2 A g$^{-1}$). Given that the mass ratio of Si in the composite is 92%, the specific capacity with respect to Si is as high as 3080 mAh g$^{-1}$. The high capacity indicates that the active materials are electrically well connected and participate fully in the electrochemical lithiation and delithiation process. Note that, this is achieved without the use of any conductive additives, indicating the excellent electrical conductivity of the graphene cage. Furthermore, a specific capacity of about 1,246 mAh g$^{-1}$ was maintained after 300 consecutive cycles at a higher rate of C/2 (~1.4 mA cm$^{-2}$), which is still over three times as large as that of commercial graphite anodes' theoretical capacity and far surpass that of Mp-Si (560 mAh g$^{-1}$ at the 10th cycle), Mp-Si@G (792 mAh g$^{-1}$ at the 300th cycle) or Mp-Si@Si (1047 mAh g$^{-1}$ at the 100th cycle, 534 mAh g$^{-1}$ at the 300th cycle). It's worth mentioning that the cycling stability of Mp-Si@Si microparticles is much better than that of dense Si microparticles (below 370 mAh g$^{-1}$ in 20 cycles), profited from the inner pore space buffering the volume expansion during the lithiation process. Nevertheless, the SEI at the surface of Mp-Si@Si is not stable, inducing the poor stability for the later cycles.

The exceptional electrochemical stability can be attributed to the well-designed micro-/nanoscale architecture of the Si—C composite electrode. The void space automatically generated during the thermal disproportionation and etching process retains secondary particles and buffers volume expansion. According to the chemical equation (1)

$$2SiO \rightarrow Si + SiO_2 \qquad (1)$$

cm$^3$ of SiO will generate 0.30 cm$^3$ of Si and 0.55 cm$^3$ of SiO$_2$ after thermal disproportionation based on their density (2.1, 2.3, and 2.6 g cm$^{-3}$ for SiO, Si, and SiO$_2$, respectively), which means a large void:Si ratio of about 11:6 was reached after SiO$_2$ removal. This large volume ratio allows for free volume expansion of Si material without breaking the graphene shell.

Figure 8D:
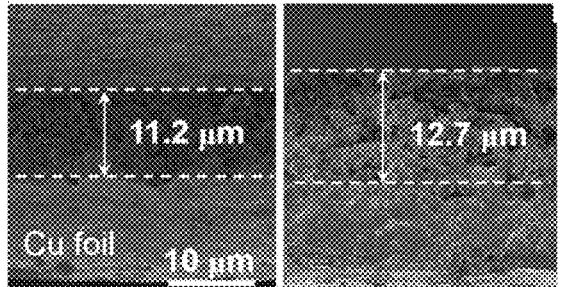
Figure 8E:
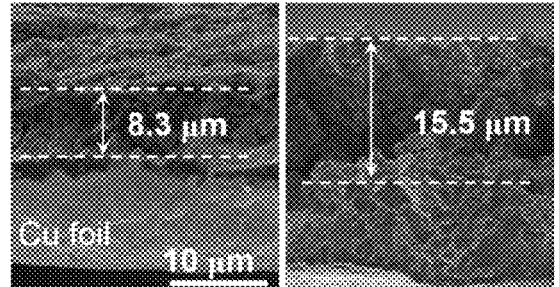

To better understand the reason for such a good cycling stability, post-cycling cross-sectional SEM analyses is carried out to show the morphology change of the Si—C composite electrode after charge/discharge. Based on the electrode thickness before and after lithiation (FIGS. 8D, 8E), the volume expansion of the Mp-Si@Si@G microparticle electrode is calculated to be only 13%, which is far less than that of Mp-Si@Si microparticles (~86%) and dense Si microparticle (over 150%), indicating an improved cycling stability.

The Mp-Si@Si@G microparticles simultaneously exhibit high Coulombic efficiency and good cycling stability. Thus, a practical full-cell battery can be constructed with high mass loading and improved cycling performance. In contrast to the nearly unlimited Li supply in half cells, full cells have a finite Li supply, therefore low early-cycle Coulombic efficiencies which means large irreversible Li-consumption will definitely cause severe battery decay. As a result, reaching high early-cycle Coulombic efficiency is extremely critical to the cycling stability of a full cell. Furthermore, it is rather challenging to achieve a good cycling stability with a high mass loading due to the more difficult charge transfer and larger volume change. In the case of the current embodiment, good cycling stability for Mp-Si@Si@G microparticles can still be achieved when the mass loading is as high as ~2.0 mg cm$^{-2}$, showing great promise for practical full cell application.

Figure 8F:
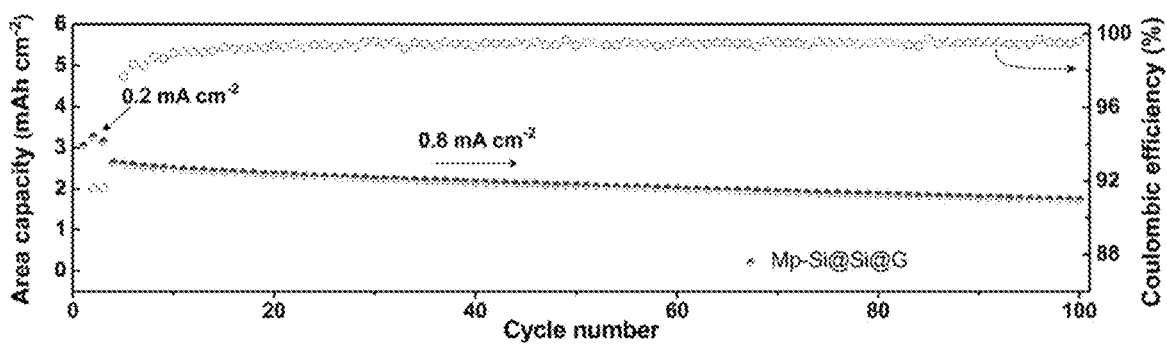

As FIG. 8F shows, when paired with a traditional lithium cobalt oxide (LCO) cathode, the Mp-Si@Si@G microparticles exhibit stable cycling (1.75 mAh cm$^{-2}$ remained after 100 cycles) and high Coulombic efficiency at a current density of 0.8 mA cm$^{-2}$. Moreover, the voltage profiles at various cycle numbers show no obvious increase in the overpotential, indicating that both anode and cathode are stable during cycling. This excellent full-cell capacity and stability for microscale Si anode materials demonstrates the great promise of our surface-engineering approach in addressing the existing challenges in today's LIBs industry.

Turning now to the synthesis of mesoporous Si (Mp-Si) microparticles. in a typical thermal disproportionation process, commercially available SiO particles (325 mesh, Sigma-Aldrich) was heated to 950° C. with a heating rate of 5° C./min and kept for 10 h under Ar atmosphere. To remove the SiO$_2$ matrix, the annealed samples were taken out of the tube at temperatures below 50° C. and immersed in 10 wt % HF solution (H$_2$O:isopropanol=3:1, v/v) at room temperature for 2 hours. The obtained mesoporous Si was collected by filtration and washed with distilled water and ethanol in sequence several times. The final product was dried in a vacuum oven at 60° C. for 2 hours and stored in a glovebox for further use.

For the synthesis of Si-sealed Mp-Si (Mp-Si@Si) microparticles, mesoporous Si microparticles were sealed with Si through a chemical vapor deposition (CVD) method. In a typical process, mesoporous Si microparticles were transferred to a tube furnace (Thermo Electron Corporation) which was then purged with high-purity Ar gas. Then the tube was heated to 550° C. with a heating rate of 50° C./min. Afterwards, both pure Ar gas and silane gas were introduced into the tube with a total pressure of 200 torr, while the partial pressure of silane is 100 torr. After reacting at 550° C. for 30 min, silane gas was cut off, and let the tube cool down under Ar atmosphere. Finally, the Si-sealed mesoporous Si microparticles were collected after the temperature is below 50° C.

With the synthesis of graphene-encapsulated Mp-Si@Si microparticles, to obtain a conformal Ni coating, the surface of Mp-Si@Si microparticles must be densely coated with a nucleation seed (Pd in this case). Using (3-Aminopropyl) triethoxysilane (APTES) as a surface-adherent layer to sensitize the Si surface with —NH$_2$ group, the Pd metal seed from solution onto Si is subsequently reduced.

1 g as-prepared Mp-Si@Si microparticles was dispersed in 100 ml isopropanol and sonicated for about 15 min. 1 ml APTES (99% pure, Sigma-Aldrich) and 100 ul distilled water were sequentially added to the isopropanol solution and stirred at 70° C. for 1 hour. This formed a very thin layer of —NH$_2$ groups at the surface of the Si microparticles. Then the sample was collected by centrifugation and washed three times with DI water. Finally, the particles were immersed in 30 ml palladium chloride aqueous solution (0.5 g/L PdCl$_2$; 2.5 ml/L concentrated HCL; Sigma-Aldrich) and stirred for 15 min. Washing three times with DI water and collecting by centrifugation resulted in activated Mp-Si@Si microparticles.

The thickness of the Ni coating can be tuned either by changing the concentration of the electroless Ni (EN) solution or controlling the number of deposition reactions. In one example, a combination of both approaches was used.

Two electroless Ni solutions were prepared: a primary solution (20 g/L nickel sulphate hexahydrate; 10 g/L sodium citrate dihydrate; 5 g/L lactic acid) and a secondary solution with double the component concentration (40 g/L nickel sulphate hexahydrate; 20 g/L sodium citrate dihydrate; 10 g/L lactic acid). Activated Mp-Si@Si microparticles were sequentially immersed in these EN solutions.

Before the first electroless deposition, 2 g of dimethylamine borane (DMAB; Sigma-Aldrich) and 2 ml of ammonium hydroxide (NH$_3$·H$_2$O, Sigma-Aldrich, 28%) were added to 360 ml of the primary EN solution. The pH-sensitive DMAB served as the reducing agent during electroless Ni deposition. 1 g of activated Mp-Si@Si microparticles was then added to the primary EN solution and gently stirred for about 30 min. Bubbles began to appear and the green-coloured EN solution became lighter in colour as the reaction proceeded. After deposition was complete, the Mp-Si@Si@1×Ni settled to the bottom. While holding the Mp-Si@Si@1×Ni particles at the bottom of the container with a magnet, the depleted EN bath was carefully poured out. In a separate container, 4 g of DMAB and 4 ml of ammonium hydroxide were added to 360 ml of the secondary EN solution. This was then added immediately to the damp particles (Mp-Si@Si@1×Ni) and stirred for another 30 min. The resulting Mp-Si@Si@2×Ni was washed twice with ethanol.

For graphene-encapsulation, Mp-Si@Si@2×Ni particles were dispersed in 150 ml triethylene glycol (Santa Cruz Biotechnology) and 500 ml NaOH aqueous solution (50%, w/w). After stirring at 185° C. for 8 h, the carburized Mp-Si@Si@2×Ni particles were collected by centrifugation and washed three times with ethanol. The carburization process occurred when the organic solvent decomposed, allowing carbon atoms to diffuse into the Ni layer and adhere to the surface. This primes the Mp-Si@Si@2×Ni particles for low-temperature graphene growth. Samples were then dried in a vacuum oven at 50° C. for 1 hour. The dried particles were placed in a tube furnace with the following temperature profile: heat to 450° C. at 15° C./min; hold temperature at 450° C. for 1 hour. An Ar flow rate of 80 sccm was maintained throughout the annealing process. During the annealing, the Brij® 58 decomposed, allowing carbon atoms to diffuse into the Ni layer and adhere to the surface. This primes the Mp-Si@Si@2×Ni for low-temperature graphene growth. The dual-purpose Ni template were etched by immersing the annealed particles in 1 M FeCl$_3$ (2 h) aqueous solution.

Graphene-encapsulated Mp-Si@Si microparticles were obtained after washing three times with 1M HCL aqueous solution and DI water and drying in a vacuum oven at 60° C. for 1 hour.

Turning now to the materials characterization, the weight percentage of Si and C in Mp-Si@Si@G was determined from the weight loss curves measured under simulated air atmosphere (20% O$_2$+80% Ar, both are ultra purity grade gases from Airgas) on a TG/DTA instrument (Netzsch STA 449) with a heating rate of 5° C./min. Under these conditions, mass increases due to slight Si oxidation, whereas carbon oxidation to gaseous species causes mass loss. To decouple these two processes, a bare Si control sample was measured at the same heating conditions and the mass gain was subtracted from the graphene-encapsulated Mp-Si@Si curve. Other characterization was carried out using scanning electron microscopy (FEI Sirion, Nova NanoSEM), transmission electron microscopy (FEI Tecnai, Titan), X-ray photoelectron spectroscopy (SSI S-Probe Monochromatized, Al Kα radiation at 1486 eV), electrochemical impedance spectroscopy (BioLogic VMP3), and Raman spectroscopy (Horiba JY).

For in situ TEM characterization, a piezo-controlled, electrical biasing TEM-AFM holder (Nanofactory Instruments) was used to observe the (de) lithiation process of graphene-encapsulated Mp-Si@Si microparticles and measure the graphene cage's electrical and mechanical properties. Li metal and Mp-Si@Si@G microparticles were dispersed onto 0.25 mm W and Cu wires, respectively. They were then brought into contact by the piezo-controller. By applying a voltage bias of −3 V, Li ions flowed through the Li metal's native oxide/nitride to alloy with Si at the working electrode. The graphene cage remained intact along with the whole lithiation process.

Regarding electrochemistry characterization, working electrodes were all prepared using a conventional slurry method. Mp-Si@Si@G powders and polyvinylidene fluoride (PVDF, Kynar HSV 900) binder with a mass ratio of 9:1 were dispersed in N-methyl-2-pyrrolidone (NMP) in the absence of any conductive additives and stirred for 12 h. Control electrodes with bare Mp-Si, Mp-Si@G or Mp-Si@Si were prepared using the same slurry method, except using a mass ratio of 8:1:1 for active material (Mp-Si or Mp-Si@Si), carbon black conductive additive (Super P, TIMCAL, Switzerland), and PVDF binder, respectively. After casting onto a 15 μm-thick Cu foil and drying at 60° C. in a vacuum oven for 12 h, the samples were calendered and cut into 1 cm$^2$ circular disks with a mass loading of 0.6-2.0 mg cm$^{-2}$. In an Ar-filled glovebox, these working electrodes were assembled into type 2032 coin cells with a polymer separator (Celgard 2250) and Li metal (Alfa Aesar) as the counter/reference electrode (half cell) or lithium cobalt oxide (LCO) as the cathode (full cell). 100 μl of 1.0 M LiPF6 in 89 vol % 1:1 w/w ethylene carbonate/diethyl carbonate (BASF Selectilyte LP40) with 10 vol % fluoroethylene carbonate and 1 vol % vinylene carbonate (Novolyte Technologies) was added as the electrolyte with full wetting of both working and counter electrode surfaces. Coin cells were loaded into a battery test (Land Instruments) and cycled between 0.01 and 1 V (half cell, 0.01 to 2.0 V for the first three activating cycles) or 3.0-4.2 V (full cell). The mass loading of the Mp-Si@Si@G electrode in a full-cell configuration was about 2.0 mg cm$^{-2}$, giving an areal capacity of about 4.7 mAh cm$^{-2}$ at a current density of 0.24 mg cm$^{-2}$ when Li metal was used as the counter electrode. The areal capacity of the LCO cathode tested with Li metal as the counter electrode was round 4.1 mAh cm$^{-2}$ at a current density of 0.3 mg cm$^{-2}$ giving a theoretical N/P ratio of about 1.14. The Si anode in the full cell was prepared exactly as described for our half-cell experiments and did not undergo any pre-cycling or pre-lithiation before being used in the full cell. The specific capacity for all cells was calculated using the total mass of the graphene-encapsulated Mp-Si@Si composite. Charge/discharge rates were calculated assuming Si's theoretical capacity (4,200 mAh g$^{-1}$ Si). Coulombic efficiency was calculated using the ratio of delithiation (Cdealloy) capacity to lithiation (Calloy) capacity (Cdealloy/Calloy×100%). For ex-situ SEM/TEM characterization of working electrodes, coin cells were charged to 1 V and disassembled. The working electrodes were then rinsed gently in acetonitrile to remove Li salts from the residual electrolyte.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, porous silicon microstructure can be composed of silicon nanoparticles, nanoflakes, nanosheets or nanorods, etc.

All such variations are considered to be within the scope and spirit of the present invention as defined by the following claims and their legal equivalents.

What is claimed:
1. A battery electrode, comprising:
   a porous silicon microstructure including a Si mesoporous microparticle having pores disposed therein;
   a silicon shell coating deposited on the porous silicon microstructure, wherein an outer contour of the porous silicon microstructure is conformally covered by the silicon shell coating such that the pores remain in the porous silicon microstructure; and
   a graphene coating deposited on the silicon shell coating, wherein the graphene coating encapsulates the silicon shell coating forming a graphene-encapsulated silicon-shell-protected porous silicon microstructure battery electrode.

2. The battery electrode according to claim 1, wherein the porous silicon microstructure comprises an annealed porous silicon microstructure.

3. The battery electrode according to claim 1, wherein the silicon shell coating comprises a higher density than a density of the porous silicon microstructure.

4. The battery electrode according to claim 1, wherein the silicon shell coating comprises a sealing-structure, wherein said sealing-structure is configured to seal an electrolyte from diffusing to the porous silicon microstructure and restricts formation of a solid electrolyte interface on a surface of the porous silicon microstructure.

5. The battery electrode according to claim 1, wherein the silicon shell coating comprises a sealing-structure, wherein said sealing-structure is configured to sustain calendering process pressures, wherein the silicon shell coating comprises a mechanical strength that is greater than a mechanical strength of the porous silicon microstructure.

6. The battery electrode according to claim 1, wherein graphene-encapsulated silicon-shell-protected porous silicon microstructure battery electrode resists a pressure of over 100 Mpa.

7. The battery electrode according to claim 1, wherein the silicon shell coating has a thickness of about 200 nm.

8. The battery electrode according to claim 1, wherein a surface area of the silicon shell coating is about five times lower than a surface area of the porous silicon microstructure.

9. The battery electrode according to claim 1, wherein the silicon shell coating is deposited on the porous silicon microstructure such that the pores of the porous silicon microstructure remain unfilled.

10. A battery electrode, comprising:
    a porous silicon microstructure including a cluster of Si nanoparticles having pores disposed between the Si nanoparticles;
    a silicon shell coating deposited on the porous silicon microstructure, wherein an outer contour of the porous silicon microstructure is conformally covered by the silicon shell coating such that the pores remain in the porous silicon microstructure; and
    a graphene coating deposited on the silicon shell coating, wherein the graphene coating encapsulates the silicon shell coating forming a graphene-encapsulated silicon-shell-protected porous silicon microstructure battery electrode.

11. The battery electrode according to claim 10, wherein the porous silicon microstructure comprises an annealed porous silicon microstructure.

12. The battery electrode according to claim 10, wherein the silicon shell coating comprises a higher density than a density of the porous silicon microstructure.

13. The battery electrode according to claim 10, wherein the silicon shell coating comprises a sealing-structure, wherein said sealing-structure is configured to seal an electrolyte from diffusing to the porous silicon microstructure and restricts formation of a solid electrolyte interface on a surface of the porous silicon microstructure.

14. The battery electrode according to claim 10, wherein the silicon shell coating comprises a sealing-structure, wherein said sealing-structure is configured to sustain calendering process pressures, wherein the silicon shell coating comprises a mechanical strength that is greater than a mechanical strength of the porous silicon microstructure.

15. The battery electrode according to claim 10, wherein graphene-encapsulated silicon-shell-protected porous silicon microstructure battery electrode resists a pressure of over 100 Mpa.

16. The battery electrode according to claim 10, wherein the silicon shell coating has a thickness of about 200 nm.

17. The battery electrode according to claim 10, wherein a surface area of the silicon shell coating is about five times lower than a surface area of the porous silicon microstructure.

18. The battery electrode according to claim 10, wherein the cluster of Si nanoparticles has a diameter ranging from 1 µm to 5 µm.

19. The battery electrode according to claim 10, wherein the silicon shell coating is deposited on the porous silicon microstructure such that the pores of the porous silicon microstructure remain unfilled.

* * * * *